US008694511B1

(12) United States Patent
Corduneanu et al.

(10) Patent No.: US 8,694,511 B1
(45) Date of Patent: Apr. 8, 2014

(54) MODIFYING SEARCH RESULT RANKING BASED ON POPULATIONS

(75) Inventors: Adrian Dumitru Corduneanu, Cambridge (CA); Michelangelo Diligenti, Zurich (IT)

(73) Assignee: Google Inc., Mountain View, CA (US)

( * ) Notice: Subject to any disclaimer, the term of this patent is extended or adjusted under 35 U.S.C. 154(b) by 235 days.

(21) Appl. No.: 11/841,313

(22) Filed: Aug. 20, 2007

(51) Int. Cl.
*G06F 17/30* (2006.01)

(52) U.S. Cl.
CPC .... *G06F 17/30011* (2013.01); *G06F 17/30023* (2013.01); *G06F 17/3005* (2013.01)
USPC .......... 707/748; 707/723; 707/752; 707/737; 707/735; 709/201; 709/203; 709/213; 709/217

(58) Field of Classification Search
USPC ............. 707/3, 4, 5, 736, 748, 751, 754, 721, 707/713, 729, 725, 743, 723, 760; 709/223
See application file for complete search history.

(56) References Cited

U.S. PATENT DOCUMENTS

| | | | |
|---|---|---|---|
| 5,265,065 A | 11/1993 | Turtle | |
| 5,488,725 A | 1/1996 | Turtle | |
| 5,696,962 A | 12/1997 | Kupiec | |
| 5,920,854 A * | 7/1999 | Kirsch et al. | ...................... 707/3 |
| 5,963,940 A | 10/1999 | Liddy et al. | |
| 6,006,222 A | 12/1999 | Culliss | |
| 6,014,665 A | 1/2000 | Culliss | |
| 6,026,388 A | 2/2000 | Liddy et al. | |
| 6,067,565 A | 5/2000 | Horvitz | |
| 6,078,916 A | 6/2000 | Culliss | |
| 6,078,917 A | 6/2000 | Paulsen et al. | |
| 6,088,692 A | 7/2000 | Driscoll | |
| 6,134,532 A | 10/2000 | Lazarus et al. | |
| 6,182,068 B1 | 1/2001 | Culliss | |
| 6,185,559 B1 | 2/2001 | Brin et al. | |
| 6,249,252 B1 | 6/2001 | Dupray | |
| 6,285,999 B1 | 9/2001 | Page | |
| 6,321,228 B1 | 11/2001 | Crandall et al. | |
| 6,327,590 B1 * | 12/2001 | Chidlovskii et al. | .......... 707/734 |
| 6,341,283 B1 | 1/2002 | Yamakawa et al. | |
| 6,353,849 B1 | 3/2002 | Linsk | |
| 6,363,378 B1 | 3/2002 | Conklin et al. | |
| 6,370,526 B1 | 4/2002 | Agrawal et al. | |
| 6,480,843 B2 | 11/2002 | Li | |
| 6,490,575 B1 | 12/2002 | Berstis | |
| 6,526,440 B1 | 2/2003 | Bharat | |
| 6,529,903 B2 | 3/2003 | Smith et al. | |
| 6,539,377 B1 | 3/2003 | Culliss | |
| 6,560,590 B1 * | 5/2003 | Shwe et al. | ..................... 706/55 |

(Continued)

FOREIGN PATENT DOCUMENTS

| | | |
|---|---|---|
| WO | WO 00/77689 | 12/2000 |
| WO | WO 01/16807 | 3/2001 |
| WO | WO 01/67297 | 9/2001 |
| WO | WO 2004/059514 | 7/2004 |

OTHER PUBLICATIONS

Google News Archive, Jul. 8, 2003, Webmasterworld.com, p..1.*
U.S. Appl. No. 12/331,872, Le et al.

(Continued)

*Primary Examiner* — Frantz Coby
(74) *Attorney, Agent, or Firm* — Fish & Richardson P.C.

(57) ABSTRACT

The present disclosure includes, among other things, systems, methods and program products for modifying search result rankings based on populations.

17 Claims, 9 Drawing Sheets

(56) References Cited

U.S. PATENT DOCUMENTS

| | | | |
|---|---|---|---|
| 6,567,103 B1 | 5/2003 | Chaudhry | |
| 6,587,848 B1 | 7/2003 | Aggarwal et al. | |
| 6,615,209 B1 | 9/2003 | Gomes | |
| 6,623,529 B1 * | 9/2003 | Lakritz | 715/205 |
| 6,658,423 B1 | 12/2003 | Pugh et al. | |
| 6,671,681 B1 * | 12/2003 | Emens et al. | 707/5 |
| 6,678,681 B1 | 1/2004 | Brin et al. | |
| 6,701,309 B1 | 3/2004 | Beeferman et al. | |
| 6,725,259 B1 | 4/2004 | Bharat | |
| 6,738,764 B2 | 5/2004 | Mao et al. | |
| 6,754,873 B1 | 6/2004 | Law et al. | |
| 6,792,416 B2 | 9/2004 | Soetarman et al. | |
| 6,795,820 B2 | 9/2004 | Barnett | |
| 6,816,850 B2 | 11/2004 | Culliss | |
| 6,853,993 B2 | 2/2005 | Ortega et al. | |
| 6,873,982 B1 | 3/2005 | Bates et al. | |
| 6,877,002 B2 | 4/2005 | Prince | |
| 6,882,999 B2 | 4/2005 | Cohen et al. | |
| 6,901,402 B1 | 5/2005 | Corston-Oliver et al. | |
| 6,912,505 B2 | 6/2005 | Linden et al. | |
| 6,944,611 B2 | 9/2005 | Flank et al. | |
| 6,944,612 B2 | 9/2005 | Roustant et al. | |
| 6,954,750 B2 | 10/2005 | Bradford | |
| 6,990,453 B2 | 1/2006 | Wang et al. | |
| 7,016,939 B1 | 3/2006 | Rothwell et al. | |
| 7,028,027 B1 * | 4/2006 | Zha et al. | 1/1 |
| 7,072,886 B2 | 7/2006 | Salmenkaita et al. | |
| 7,085,761 B2 | 8/2006 | Shibata | |
| 7,113,939 B2 | 9/2006 | Chou et al. | |
| 7,117,206 B1 | 10/2006 | Bharat et al. | |
| 7,136,849 B2 | 11/2006 | Patrick | |
| 7,146,361 B2 | 12/2006 | Broder et al. | |
| 7,222,127 B1 | 5/2007 | Bem et al. | |
| 7,231,399 B1 | 6/2007 | Bem et al. | |
| 7,243,102 B1 | 7/2007 | Naam et al. | |
| 7,266,765 B2 | 9/2007 | Golovchinsky et al. | |
| 7,293,016 B1 | 11/2007 | Shakib et al. | |
| 7,379,951 B2 | 5/2008 | Chkodrov et al. | |
| 7,382,358 B2 | 6/2008 | Kushler et al. | |
| 7,395,222 B1 | 7/2008 | Sotos | |
| 7,426,507 B1 | 9/2008 | Patterson | |
| 7,451,487 B2 | 11/2008 | Oliver et al. | |
| 7,516,146 B2 | 4/2009 | Robertson et al. | |
| 7,526,470 B1 | 4/2009 | Karnawat et al. | |
| 7,533,092 B2 | 5/2009 | Berkhin et al. | |
| 7,533,130 B2 * | 5/2009 | Narayana et al. | 1/1 |
| 7,552,112 B2 | 6/2009 | Jhala et al. | |
| 7,565,363 B2 | 7/2009 | Anwar | |
| 7,565,367 B2 | 7/2009 | Barrett et al. | |
| 7,566,363 B2 | 7/2009 | Starling et al. | |
| 7,574,530 B2 | 8/2009 | Wang et al. | |
| 7,584,181 B2 | 9/2009 | Zeng et al. | |
| 7,610,282 B1 | 10/2009 | Datar et al. | |
| 7,657,626 B1 | 2/2010 | Zwicky | |
| 7,680,775 B2 | 3/2010 | Levin et al. | |
| 7,693,818 B2 | 4/2010 | Majumder | |
| 7,716,225 B1 | 5/2010 | Dean et al. | |
| 7,747,612 B2 | 6/2010 | Thun et al. | |
| 7,756,887 B1 | 7/2010 | Haveliwala | |
| 7,783,632 B2 | 8/2010 | Richardson et al. | |
| 7,801,885 B1 | 9/2010 | Verma | |
| 7,809,716 B2 | 10/2010 | Wang et al. | |
| 7,818,320 B2 | 10/2010 | Makeev | |
| 7,836,058 B2 | 11/2010 | Chellapilla | |
| 7,844,589 B2 | 11/2010 | Wang et al. | |
| 7,849,089 B2 | 12/2010 | Zhang et al. | |
| 7,853,557 B2 | 12/2010 | Schneider et al. | |
| 7,877,404 B2 | 1/2011 | Achan et al. | |
| 7,895,177 B2 | 2/2011 | Wu | |
| 7,953,740 B1 | 5/2011 | Vadon et al. | |
| 7,974,974 B2 | 7/2011 | Tankovich et al. | |
| 7,987,185 B1 | 7/2011 | Mysen et al. | |
| 8,019,650 B2 | 9/2011 | Donsbach et al. | |
| 8,024,325 B2 | 9/2011 | Tong et al. | |
| 8,024,330 B1 | 9/2011 | Franco et al. | |
| 8,027,439 B2 | 9/2011 | Zoldi et al. | |
| 8,037,042 B2 | 10/2011 | Anderson et al. | |
| 8,037,043 B2 | 10/2011 | Zoeter et al. | |
| 8,051,061 B2 | 11/2011 | Niu et al. | |
| 8,060,497 B1 | 11/2011 | Zatsman et al. | |
| 8,065,296 B1 | 11/2011 | Franz et al. | |
| 8,069,182 B2 | 11/2011 | Pieper | |
| 8,073,263 B2 | 12/2011 | Hull et al. | |
| 8,073,772 B2 | 12/2011 | Bishop et al. | |
| 8,086,599 B1 | 12/2011 | Heymans | |
| 8,090,717 B1 | 1/2012 | Bharat et al. | |
| 8,156,111 B2 | 4/2012 | Jones et al. | |
| 8,224,827 B2 | 7/2012 | Dean et al. | |
| 2001/0000356 A1 | 4/2001 | Woods | |
| 2002/0034292 A1 | 3/2002 | Tuoriniemi et al. | |
| 2002/0042791 A1 | 4/2002 | Smith et al. | |
| 2002/0049752 A1 | 4/2002 | Bowman et al. | |
| 2002/0103790 A1 | 8/2002 | Wang et al. | |
| 2002/0123988 A1 | 9/2002 | Dean et al. | |
| 2002/0133481 A1 | 9/2002 | Smith et al. | |
| 2002/0165849 A1 | 11/2002 | Singh et al. | |
| 2003/0009399 A1 | 1/2003 | Boerner | |
| 2003/0018707 A1 | 1/2003 | Flocken | |
| 2003/0028529 A1 | 2/2003 | Cheung et al. | |
| 2003/0037074 A1 | 2/2003 | Dwork et al. | |
| 2003/0078914 A1 | 4/2003 | Witbrock | |
| 2003/0120654 A1 | 6/2003 | Edlund et al. | |
| 2003/0135490 A1 | 7/2003 | Barrett et al. | |
| 2003/0149704 A1 | 8/2003 | Yayoi et al. | |
| 2003/0167252 A1 | 9/2003 | Odom et al. | |
| 2003/0195877 A1 | 10/2003 | Ford et al. | |
| 2003/0204495 A1 | 10/2003 | Lehnert | |
| 2003/0220913 A1 * | 11/2003 | Doganata et al. | 707/3 |
| 2003/0229640 A1 | 12/2003 | Carlson et al. | |
| 2004/0006456 A1 | 1/2004 | Loofbourrow | |
| 2004/0006740 A1 | 1/2004 | Krohn et al. | |
| 2004/0034632 A1 | 2/2004 | Carmel et al. | |
| 2004/0059708 A1 | 3/2004 | Dean et al. | |
| 2004/0083205 A1 * | 4/2004 | Yeager | 707/3 |
| 2004/0093325 A1 | 5/2004 | Banerjee et al. | |
| 2004/0119740 A1 | 6/2004 | Chang et al. | |
| 2004/0122811 A1 | 6/2004 | Page | |
| 2004/0153472 A1 | 8/2004 | Rieffanaugh, Jr. | |
| 2004/0158560 A1 | 8/2004 | Wen et al. | |
| 2004/0186828 A1 | 9/2004 | Yadav | |
| 2004/0186996 A1 | 9/2004 | Gibbs et al. | |
| 2004/0199419 A1 | 10/2004 | Kim et al. | |
| 2004/0215607 A1 | 10/2004 | Travis, Jr. | |
| 2005/0015366 A1 * | 1/2005 | Carrasco et al. | 707/3 |
| 2005/0027691 A1 | 2/2005 | Brin et al. | |
| 2005/0033803 A1 | 2/2005 | Vleet et al. | |
| 2005/0050014 A1 | 3/2005 | Gosse et al. | |
| 2005/0055342 A1 | 3/2005 | Bharat et al. | |
| 2005/0055345 A1 | 3/2005 | Ripley | |
| 2005/0060290 A1 | 3/2005 | Herscovici et al. | |
| 2005/0060310 A1 * | 3/2005 | Tong et al. | 707/7 |
| 2005/0060311 A1 | 3/2005 | Tong et al. | |
| 2005/0071741 A1 | 3/2005 | Acharya et al. | |
| 2005/0102202 A1 * | 5/2005 | Linden et al. | 705/27 |
| 2005/0102282 A1 * | 5/2005 | Linden | 707/3 |
| 2005/0125376 A1 | 6/2005 | Curtis et al. | |
| 2005/0160083 A1 * | 7/2005 | Robinson | 707/3 |
| 2005/0192946 A1 * | 9/2005 | Lu et al. | 707/3 |
| 2005/0198026 A1 | 9/2005 | Dehlinger et al. | |
| 2005/0222987 A1 | 10/2005 | Vadon | |
| 2005/0222998 A1 | 10/2005 | Driessen et al. | |
| 2005/0240576 A1 | 10/2005 | Piscitello et al. | |
| 2005/0240580 A1 * | 10/2005 | Zamir et al. | 707/4 |
| 2005/0256848 A1 * | 11/2005 | Alpert et al. | 707/3 |
| 2006/0047643 A1 * | 3/2006 | Chaman | 707/3 |
| 2006/0069667 A1 | 3/2006 | Manasse et al. | |
| 2006/0089926 A1 * | 4/2006 | Knepper et al. | 707/3 |
| 2006/0095421 A1 | 5/2006 | Nagai et al. | |
| 2006/0106793 A1 | 5/2006 | Liang | |
| 2006/0122979 A1 * | 6/2006 | Kapur et al. | 707/3 |
| 2006/0173830 A1 | 8/2006 | Smyth et al. | |
| 2006/0195443 A1 | 8/2006 | Franklin et al. | |
| 2006/0200476 A1 * | 9/2006 | Gottumukkala et al. | 707/100 |
| 2006/0200556 A1 | 9/2006 | Brave et al. | |

(56) References Cited

U.S. PATENT DOCUMENTS

| | | | |
|---|---|---|---|
| 2006/0230040 A1 | 10/2006 | Curtis et al. | |
| 2007/0005575 A1 | 1/2007 | Dai et al. | |
| 2007/0005588 A1 | 1/2007 | Zhang et al. | |
| 2007/0038601 A1* | 2/2007 | Guha | 707/3 |
| 2007/0038620 A1* | 2/2007 | Ka et al. | 707/5 |
| 2007/0038659 A1 | 2/2007 | Datar et al. | |
| 2007/0061211 A1 | 3/2007 | Ramer et al. | |
| 2007/0081197 A1 | 4/2007 | Omoigui | |
| 2007/0106659 A1 | 5/2007 | Lu et al. | |
| 2007/0112730 A1 | 5/2007 | Gulli et al. | |
| 2007/0130370 A1 | 6/2007 | Akaezuwa | |
| 2007/0156677 A1* | 7/2007 | Szabo | 707/5 |
| 2007/0192190 A1 | 8/2007 | Granville | |
| 2007/0208730 A1 | 9/2007 | Agichtein et al. | |
| 2007/0214131 A1 | 9/2007 | Cucerzan et al. | |
| 2007/0233653 A1 | 10/2007 | Biggs et al. | |
| 2007/0255689 A1 | 11/2007 | Sun et al. | |
| 2007/0260597 A1 | 11/2007 | Cramer et al. | |
| 2007/0266021 A1 | 11/2007 | Aravamudan et al. | |
| 2007/0266439 A1 | 11/2007 | Kraft | |
| 2007/0288450 A1* | 12/2007 | Datta et al. | 707/5 |
| 2008/0010143 A1 | 1/2008 | Kniaz et al. | |
| 2008/0027913 A1 | 1/2008 | Chang et al. | |
| 2008/0052219 A1 | 2/2008 | Sandholm et al. | |
| 2008/0052273 A1 | 2/2008 | Pickens | |
| 2008/0059453 A1 | 3/2008 | Laderman | |
| 2008/0077570 A1 | 3/2008 | Tang et al. | |
| 2008/0082518 A1 | 4/2008 | Loftesness | |
| 2008/0091650 A1 | 4/2008 | Fontoura et al. | |
| 2008/0114624 A1 | 5/2008 | Kitts | |
| 2008/0114729 A1 | 5/2008 | Raman et al. | |
| 2008/0114750 A1 | 5/2008 | Saxena et al. | |
| 2008/0140699 A1 | 6/2008 | Jones et al. | |
| 2008/0162475 A1 | 7/2008 | Meggs et al. | |
| 2008/0183660 A1 | 7/2008 | Szulczewski | |
| 2008/0189269 A1 | 8/2008 | Olsen | |
| 2008/0208825 A1 | 8/2008 | Curtis et al. | |
| 2008/0215563 A1* | 9/2008 | Shi et al. | 707/5 |
| 2008/0228442 A1 | 9/2008 | Lippincott et al. | |
| 2008/0244053 A1* | 10/2008 | Sampson et al. | 709/223 |
| 2008/0256050 A1 | 10/2008 | Zhang et al. | |
| 2008/0313168 A1 | 12/2008 | Liu et al. | |
| 2008/0313247 A1 | 12/2008 | Galvin | |
| 2009/0012969 A1 | 1/2009 | Rail et al. | |
| 2009/0055392 A1* | 2/2009 | Gupta et al. | 707/5 |
| 2009/0157643 A1 | 6/2009 | Gollapudi et al. | |
| 2009/0182723 A1 | 7/2009 | Shnitko et al. | |
| 2009/0265290 A1* | 10/2009 | Ciaramita et al. | 706/12 |
| 2009/0265338 A1* | 10/2009 | Kraft et al. | 707/5 |
| 2009/0287656 A1 | 11/2009 | Bennett | |
| 2010/0106706 A1 | 4/2010 | Rorex et al. | |
| 2010/0131563 A1 | 5/2010 | Yin | |
| 2010/0205541 A1 | 8/2010 | Rapaport et al. | |
| 2010/0228738 A1 | 9/2010 | Mehta et al. | |
| 2010/0241472 A1 | 9/2010 | Hernandez | |
| 2010/0318546 A1* | 12/2010 | Kenthapadi et al. | 707/759 |
| 2011/0064796 A1 | 3/2011 | Tosi et al. | |
| 2011/0295844 A1 | 12/2011 | Sun et al. | |
| 2012/0191705 A1 | 7/2012 | Tong et al. | |

OTHER PUBLICATIONS

Agichtein, Eugene et al., "Improving Web Search Ranking by Incorporating User Behavior Information", *SIGIR '06*, Aug. 6-11, 2006, Seattle, WA, pp. 19-26.
Agichtein, Eugene et al., "Learning User Interaction Models for Predicting Web Search Result Preferences", *Proceedings of the 29th Annual International ACM SIGIR Conference on Research and Development in Information Retrieval*, Seattle Washington, (2006), pp. 3-10.
Boyan, Justin et al., "A Machine Learning Architecture for Optimizing Web Search Engines", School of Computer Science, Carnegie Mellon University, May 10, 1996, to appear in AAAI Workshop in Internet-Based Information Systems, Oregon, 1996, pp. 1-8.
Cutrell, Edward et al., "Eye tracking MSN Search: Investigating snippet length, target position and task types", Jan. 2007, pp. 1-13.
Joachims, Thorsten, "Optimizing Search Engines using Clickthrough Data", *Proceedings of the Eighth ACM SIGKDD International Conference on Knowledge Discovery and Data Mining*, Edmonton, Alberta, Canada (2002), pp. 133-142.
Kelly, Diane et al., "Implicit Feedback for Inferring User Preference: A Bibliography", SCILS, Rutgers University, New Brunswick, NJ 08901, 11 pages.
Diligenti, et al., Users, Queries and Documents: A Unified Representation for Web Mining, wi-iat, vol. 1, 2009 IEEE/WIC/ACM International Joint Conference on Web Intelligence and Intelligent Agent Technology, 2009, pp. 238-244.
Linden, Greg et al., Amazon.com Recommendations: Item-to-Item Collaborative Filtering, [online], http://computer.org/internet/, IEEE Internet Computing, Jan.-Feb. 2003, IEEE Computer Society, pp. 76080.
Burke, Robin, Integrating Knowledge'based and Collaborative-filtering Recommender Systems, AAAI Technical Report WS-99-01. Compilation copyright © 1999, AAAI (www.aaai.org), pp. 69-72.
Grêar, Miha, User Profiling: Collaborative Filtering, SIKDD 2004, Oct. 12-15, 2004, Ljubljana, Slovenia, 4 pages.
Nicole, Kristen, Heeii is StumbleUpon Plus Google Suggestions, [online], Retrieved from the Internet http://mashable.com/2007/05/15/heeii/, 11 pages.
Hofmann, Thomas, Latent Semantic Models for Collaborative Filtering, ACM Transactions on Information Systems, vol. 22, No. 1, Jan. 2004, pp. 89-115.
Lemire, Daniel, Scale and Translation Invariant Collaborative Filtering Systems, Published in Information Retrieval, 8(1), pp. 129-150, 2005.
Radlinski et al., Query Chains: Learning to Rank from Implicit Feedback, KDD '05, Aug. 21-24, 2005, Chicago, Illinois, USA, 10 pages.
Schwab, et al., Adaptivity through Unobstrusive Learning, 2002, 16(3), pp. 5-9.
Stoilova, Lubomira et al., GiveALink: Mining a Semantic Network of Bookmarks for Web Search and Recommendation, LinkKDD '05, Aug. 21, 2005, Chicago, IL, USA, 8 pages.
Xiao, et al., Measuring Similarity of Interests for Clustering Web-Users, ADC, 2001, p. 107-114.
Xie et al., Web User Clustering from Access Log Using Belief Function, K-CAP '01, Oct. 22- 23, 2001, Victoria, British Columbia, Canada, pp. 202-208.
Yu et al., Selecting Relevant Instances for Efficient and Accurate Collaborative Filtering, CIKM '01, Nov. 5-10, 2001, Atlanta, Georgia, pp. 239-246.
Zeng et al., Similarity Measure and Instance Selection for Collaborative Filtering, WWW '03, May 20-24, 2003, Budapest, Hungary, pp. 652-658.
U.S. Appl. No. 12/623,276, filed Nov. 20, 2009, Modifying Scoring Data Based On Historical Changes, Kim et al.
U.S. Appl. No. 12/699,549, filed Feb. 3, 2010, Evaluating Website Properties by Partitioning User Feedback, Fernandes et al.
U.S. Appl. No. 11/870,893, filed Oct. 11, 2007, Time Based Ranking, McDonnell.
Bar-Llan et al., "Presentation Bias is Significant in Determining User Preference for Search Results—A User X Study"; Journal of the American Society for Information Science and Technology, vol. 60, Issue 1 (p. 135-149), Sep. 2008, 15 pages.
Bar-Llan et al.; "Methods for comparing rankings of search engine results"; Computer Networks: The International Journal of Computer and Telecommunications Networking, Jul. 2006, vol. 50, Issue 10, 19 pages.
Boldi, et al.; *The Query-flow Graph: Model and Applications*; CKIM '08, Oct. 26-30, Napaya Valley, California, USA, pp. 609-617.
Craswell, et al.; *Random Walks on the Click Graph*; Jul. 2007; SIGIR '07, Amsterdam, the Netherlands, 8 pages.
Joachims, T., Evaluating retrieval performance using clickthrough data. Proceedings of the SIGIR Workshop on Mathematical/Formal Methods in Information Retrieval; Aug. 12-15, 2002; Tampere, Finland, 18 pages.
Joachims et al., "Search Engines that Learn from Implicit Feedback"; Aug. 2007, IEEE Computer Society.

(56) References Cited

OTHER PUBLICATIONS

W3C, URIs, URLs and URNs: Classification and Recommendations 1.0, Report from the joint W3C/IETF URI Planning Interest Group, Sep. 21, 2001, 8 pages.
U.S. Appl. No. 10/726,345, filed Dec. 3, 2003, Pearson et al., System and Methods for Improved Searching.
U.S. Appl. No. 10/878,926, filed Jun. 28, 2004, Battle et al., Systems and Methods for Deriving and Using an Interaction Profile.
U.S. Appl. No. 11/556,086, filed Nov. 2, 2006, Diligenti et al., Search Result Inputs Using Stop Word Generalized Queries.
U.S. Appl. No. 11/556,100, filed Nov. 2, 2006, Diligenti et al., Search Result Inputs Using Variant Generalized Queries.
U.S. Appl. No. 11/556,143, filed Nov. 2, 2006, Kim et al., Modifying Search Result Ranking Based on Implicit User Feedback.
U.S. Appl. No. 11/582,767, filed Oct. 17, 2006, Baker et al., Method and Apparatus for Generating Lexical Synonyms for Query Terms (abandoned).
U.S. Appl. No. 11/647,888, filed Dec. 29, 2006, Baker et al., Ensuring That a Synonym for a Query Phrase Does Not Drop Information Present in the Query Phrase.
U.S. Appl. No. 11/651,282, filed Jan. 9, 2007, Heymans, Method and Apparatus for Automatically Identifying Compounds.
U.S. Appl. No. 11/685,095, filed Mar. 12, 2007, Kim et al., Modifying Search Result Ranking Based on Implicit User Feedback and a Model of Presentation Bias.
U.S. Appl. No. 11/686,288, filed Mar. 14, 2007, Diligenti et al., Detecting Click Spam.
U.S. Appl. No. 11/742,447, filed Apr. 30, 2007, Stets et al., Modifying Search Result Ranking Based on a Temporal Element of User Feedback.
U.S. Appl. No. 11/781,155, filed Jul. 20, 2007, Diligenti et al., Search Result Inputs Using Generalized Queries.
U.S. Appl. No. 12/551,052, filed Aug. 31, 2009, Kim et al., Refining Search Results.
U.S. Appl. No. 12/572,739, filed Oct. 2, 2009, McDonnell et al., Recent Interest Based Relevance Scoring.
U.S. Appl. No. 12/506,203, filed Jul. 20, 2009, Tong et al., Generating a Related Set of Documents for an Initial Set of Documents.
U.S. Appl. No. 12/717,064, filed Mar. 3, 2010, Kuramochi et al., Framework for Testing Search Result Hypotheses.
U.S. Appl. No. 12/632,279, filed Dec. 7, 2009, Serboncini et al., Dentification and Uses of Search Entity Transition Probabilities.
U.S. Appl. No. 12/756,749, filed Apr. 8, 2010, Lopatenko et al., Ranking Search Results Based on Similar Queries.
U.S. Appl. No. 12/723,973, filed Mar. 15, 2010, Nerurkar, Ranking Search Results Based on Anchors.
U.S. Appl. No. 12/717,475, filed Mar. 4, 2010, Thakur, et al., Deriving Site Reputation and Focus From User Feedback Statistics.
U.S. Appl. No. 12/718,634, filed Mar. 5, 2010, Kim et al., Temporal-Based Score Adjustments.
U.S. Appl. No. 12/842,345, filed Jul. 23, 2010, Chen et al., Combining User Feedback.
U.S. Appl. No. 12/982,633, filed Dec. 30, 2010, Adams et al., Modifying Ranking Data Based on Document Changes.
Zeng, et al., "Learning to Cluster Web Search Results", SIGIR '04, Proceedings of the 27th Annual International ACM SIGIR conference on research and development in information retrieval, 2004.
U.S. Appl. No. 13/310,901, filed Dec. 5, 2011, Kim et al., Refining Search Results.
U.S. Appl. No. 13/476,875, filed May 21, 2012, Lopatenko et al., Ranking Search Results Based on Similar Queries.
Joachims; Optimizing search engines using clickthrough data; 2002; Proceedings of the ACM SIGKDD International Conference on Knowledge Discovery and Data Mining, p. 133-142, 10 pages.
Jansen et al., "An Analysis of Web Documents Retrieved and Viewed", School of Information Sciences and Technology, The Pennsylvania State University, the 4th International Conference on Internet Computing, Las Vegas, Nevada, pp. 65-69, Jun. 23-26, 2003, 5 pages.
Soumen Chakrabarti, et al. "Enhanced Topic Distillation using Text, Markup tags, and Hyperlinks". ACM 2001, pp. 208-216.
Gabriel Somlo et al., "Using Web Hepler Agent Profiles in Query Generation", ACM, Jul. 2003, pp. 812-818.
Australian Patent Office Non-Final Office Action in AU App. Ser. No. 2004275274, mailed Feb. 3, 2010, 2 pages.
Dan Olsen et al., "Query-by-critique: Spoken Language Access to Large Lists", ACM, Oct. 2002, pp. 131-140.
Susan Gauch et al., "A Corpus Analysis Approach for Automatic Query Expansion and its Extension to Multiple Databases", ACM, 1999, pp. 250-269.
Nicolas Bruno et al., "Top-K Selection Queries over Relational Databases: Mapping Strategies and Performance Evaluation", ACM, Jun. 2002, pp. 153-187.
Ji-Rong Wen et al., "Query Clustering using User Logs", ACM, Jan. 2002, pp. 59-81.
Brin, S. and L. Page, The Anatomy of a Large-Scale Hypertextual Web Search Engine, Computer Science Department, 1998.
International Search Report and Written Opinion for Application No. PCT/US2004/029615, dated Jan. 19, 2005, 8 pages.
Hungarian Patent Office, International Search Report and Written Opinion for Application No. 200806756-3, dated Nov. 19, 2010 12 pages.
Authorized Officer Athina Nickitas-Etienne, International Preliminary Report and Written Opinion for Application No. PCT/US2004/029615, mailed Mar. 23, 2006.
Indian Office Action in Indian Application No. 686/KOLNP/2006, mailed Jun. 3, 2008, 2 pages.
Danish Search Report and Written Opinion for Application No. 200601630-7, dated Jun. 21, 2007, 15 pages.
Jones et al., "Pictures of Relevance: A Geometric Analysis of Similarity Measures", Journal of the American Society for Information Science, Nov. 1987, 23 pages.
Kaplan et al., "Adaptive Hypertext Navigation Based On User Goals and Context", User Modeling and User-Adapted Interaction 2, 1993; pp. 193-220, 28 pages.
Liddy et al., "A Natural Language Text Retrieval System With Relevance Feedback", 16th National Online, 1995, 3 pages.

\* cited by examiner

MODIFYING SEARCH RESULT RANKING BASED ON POPULATIONS

BACKGROUND

The present disclosure relates to ranking of search results.

Internet search engines aim to identify documents or other items that are relevant to a user's needs and to present the documents or items in a manner that is most useful to the user. Such activity often involves a fair amount of mind-reading— inferring from various clues what the user wants. Certain clues may be user specific. For example, knowledge that a user is making a request from a mobile device, and knowledge of the location of the device, can result in much better search results for such a user.

Clues about a user's needs may also be more general. For example, search results can have an elevated importance, or inferred relevance, if a number of other search results link to them. If the linking results are themselves highly relevant, then the linked-to results may have a particularly high relevance. Such an approach to determining relevance, generally associated with the GOOGLE® PageRank technology, is premised on the assumption that, if authors of web pages felt that another web site was relevant enough to be linked to, then web searchers would also find the site to be particularly relevant. In short, the web authors "vote up" the relevance of the sites.

Other various inputs may be used instead of, or in addition to, such techniques for determining and ranking search results. For example, user reactions to particular search results or search result lists may be gauged, so that results on which users often click will receive a higher ranking. The general assumption under such an approach is that searching users are often the best judges of relevance, so that if they select a particular search result, it is likely to be relevant, or at least more relevant than the presented alternatives.

SUMMARY

Systems, methods, and apparatus including computer program products for ranking search results of a search query are described. In general, particular inputs may be generated or analyzed to affect the presentation of search results. For example, such inputs may increase the relevance that a system will assign to a particular result in a particular situation, thus boosting the score or other indicator of relevance for the result (and perhaps the relevance of the result in the context of a particular query). Such an approach may benefit a user by providing them with search results that are more likely to match their needs. As a result, users can learn more using the internet, can find more relevant information more quickly, and will thus achieve more in their work or elsewhere, and will be more likely to use such a system again. A provider of such services may also benefit, by providing more useful services to users, and by thereby inducing more traffic to their search services. Such additional traffic may provide an operator with additional revenue, such as in the form of advertising that accompanies the searching and the delivery of search results.

In general, one or more aspects of the subject matter described in this specification can be embodied in one or more methods that include associating a query with one or more first prior queries in a first population, the prior queries associated with a document in the ranking. The query is associated with one or more second prior queries in one or more second populations encompassing the first population, the second prior queries associated with the document. Second data is deemphasized from the second prior queries relative to first data from the first prior queries. First data is combined with the deemphasized second data to create a quality of result statistic for the document. The statistic is provided as an input to a ranking. Other embodiments of this aspect include corresponding systems, apparatus, and computer program products.

These and other embodiments can optionally include one or more of the following features. The second data can be deemphasized if a language of the query and a language of a user interface into which the query was entered are the same. The second data can be deemphasized if a language of the document and a language of a user interface into which the query was entered are the same. The first population is country-specific, one of the second populations is language-specific. One of the second populations can be generic. The first data and the second data are based on aggregated click data.

Particular embodiments of the described subject matter can be implemented to realize one or more of the following advantages. A ranking sub-system can include a rank modifier engine that uses implicit user feedback to cause re-ranking of search results in order to improve the final ranking presented to a user of an information retrieval system. User selections of search results (click data) can be tracked and transformed into a background probability of user selection, and this background probability can be used to adjust future search result rankings. A prior model can be used to estimate what the implicit feedback should be for results that are too infrequent, or too recent to have sufficient historical records of implicit feedback applicable to them.

The details of one or more implementations are set forth in the accompanying drawings and the description below. Other features, aspects, and advantages will become apparent from the description, the drawings, and the claims.

DESCRIPTION OF THE DRAWINGS

Like reference numbers and designations in the various drawings indicate like elements.

DETAILED DESCRIPTION

Figure 1:
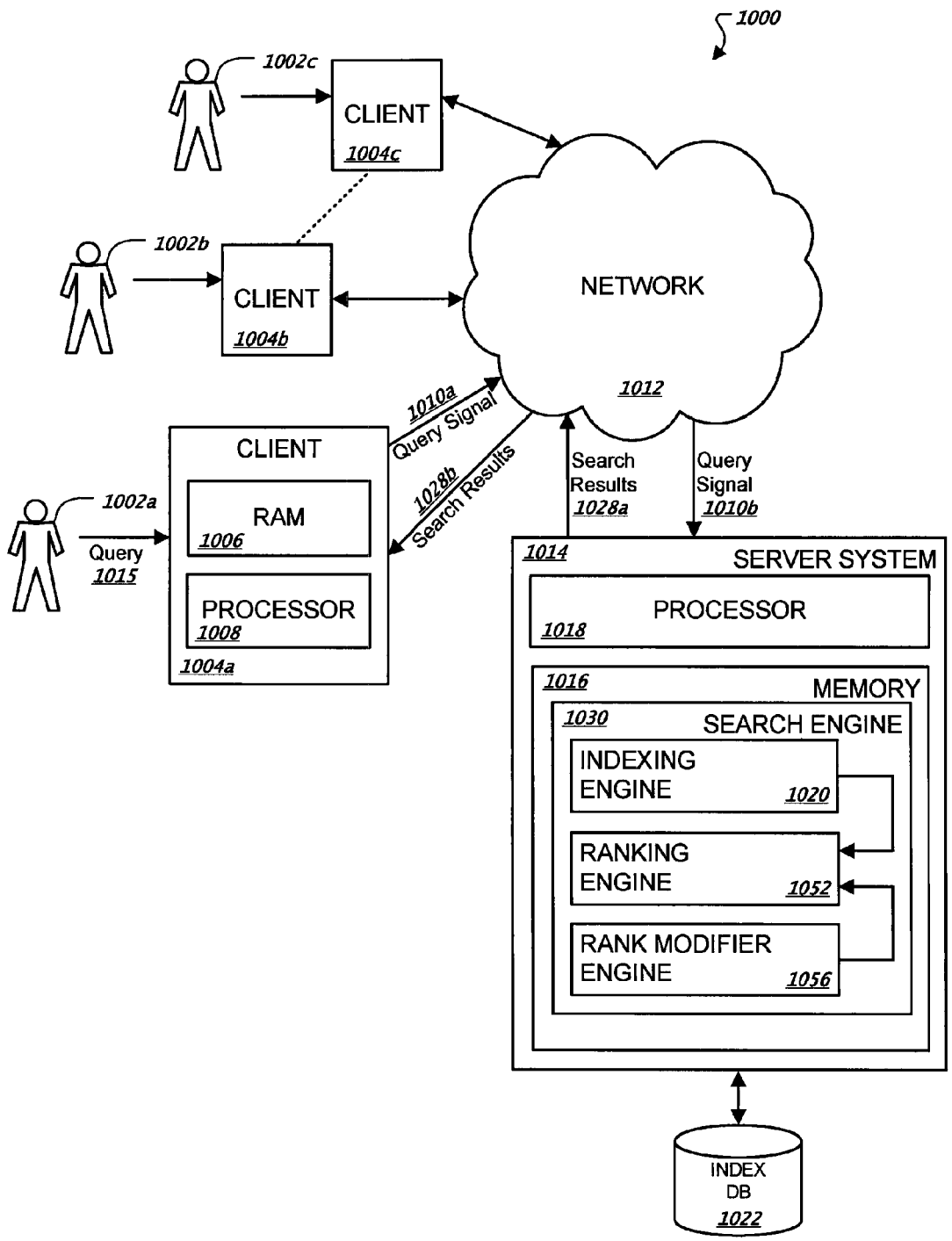
FIG. 1 shows an example information retrieval system in which the relevance of results obtained for submitted search queries can be improved.

FIG. 1 shows an example system 1000 for improving the relevance of results obtained from submitting search queries as can be implemented in an internet, intranet, or other client/ server environment. The system 1000 is an example of an information retrieval system in which the systems, components and techniques described below can be implemented. Although several components are illustrated, there may be fewer or more components in the system 1000. Moreover, the components can be distributed on one or more computing devices connected by one or more networks or other suitable communication mediums.

A user 1002 (1002*a*, 1002*b*, 1002*c*) can interact with the system 1000 through a client device 1004 (1004*a*, 1004*b*, 1004*c*) or other device. For example, the client device 1004 can be a computer terminal within a local area network (LAN) or wide area network (WAN). The client device 1004 can include a random access memory (RAM) 1006 (or other memory and/or a storage device) and a processor 1008. The processor 1008 is structured to process instructions within the system 1000. In some implementations, the processor 1008 is a single-threaded processor. In other implementations, the processor 1008 is a multi-threaded processor. The processor 1008 can include multiple processing cores and is structured to process instructions stored in the RAM 1006 (or other memory and/or a storage device included with the client device 1004) to display graphical information for a user interface.

A user 1002*a* can connect to a search engine 1030 within a server system 1014 to submit a query 1015. When the user 1002*a* submits the query 1015 through an input device attached to a client device 1004*a*, a client-side query signal 1010*a* is sent into a network 1012 and is forwarded to the server system 1014 as a server-side query signal 1010*b*. Server system 1014 can be one or more server devices in one or more locations. A server device 1014 includes a memory device 1016, which can include the search engine 1030 loaded therein. A processor 1018 is structured to process instructions within the system 1014. These instructions can implement one or more components of the search engine 1030. The processor 1018 can be a single-threaded processor or a multi-threaded processor, and can include multiple processing cores. The processor 1018 can process instructions stored in the memory 1016 related to the search engine 1030 and can send information to the client device 1004, through the network 1012, to create a graphical presentation in a user interface of the client device 1004 (e.g., a search results web page displayed in a web browser).

The server-side query signal 1010*b* is received by the search engine 1030. The search engine 1030 uses the information within the user query 1015 (e.g. query terms) to find relevant documents. The search engine 1030 can include an indexing engine 1020 that actively searches a corpus (e.g., web pages on the Internet) to index the documents found in that corpus, and the index information for the documents in the corpus can be stored in an index database 1022. This index database 1022 can be accessed to identify documents related to the user query 1015. Note that, an electronic document (which for brevity will simply be referred to as a document) does not necessarily correspond to a file. A document can be stored in a portion of a file that holds other documents, in a single file dedicated to the document in question, or in multiple coordinated files.

The search engine 1030 can include a ranking engine 1052 to rank the documents related to the user query 1015. The ranking of the documents can be performed using traditional techniques for determining an information retrieval (IR) score for indexed documents in view of a given query. The relevance of a particular document with respect to a particular search term or to other provided information may be determined by any appropriate technique. For example, the general level of back-links to a document that contains matches for a search term may be used to infer a document's relevance. In particular, if a document is linked to (e.g., is the target of a hyperlink) by many other relevant documents (e.g., documents that also contain matches for the search terms), it can be inferred that the target document is particularly relevant. This inference can be made because the authors of the pointing documents presumably point, for the most part, to other documents that are relevant to their audience.

If the pointing documents are in turn the targets of links from other relevant documents, they can be considered more relevant, and the first document can be considered particularly relevant because it is the target of relevant (or even highly relevant) documents. Such a technique may be the determinant of a document's relevance or one of multiple determinants. The technique is exemplified in the GOGGLE® PageRank system, which treats a link from one web page to another as an indication of quality for the latter page, so that the page with the most such quality indicators is rated higher than others. Appropriate techniques can also be used to identify and eliminate attempts to cast false votes so as to artificially drive up the relevance of a page.

To further improve such traditional document ranking techniques, the ranking engine 1052 can receive an additional signal from a rank modifier engine 1056 to assist in determining an appropriate ranking for the documents. The rank modifier engine 1056 provides one or more prior models, or one or more measures of relevance for the documents based on one or more prior models, which can be used by the ranking engine 1052 to improve the search results' ranking provided to the user 1002. In general, a prior model represents a background probability of document result selection given the values of multiple selected features, as described further below. The rank modifier engine 1056 can perform one or more of the operations described below to generate the one or more prior models, or the one or more measures of relevance based on one or more prior models.

The search engine 1030 can forward the final, ranked result list within a server-side search results signal 1028*a* through the network 1012. Exiting the network 1012, a client-side search results signal 1028*b* can be received by the client device 1004*a* where the results can be stored within the RAM 1006 and/or used by the processor 1008 to display the results on an output device for the user 1002*a*.

Figure 2:
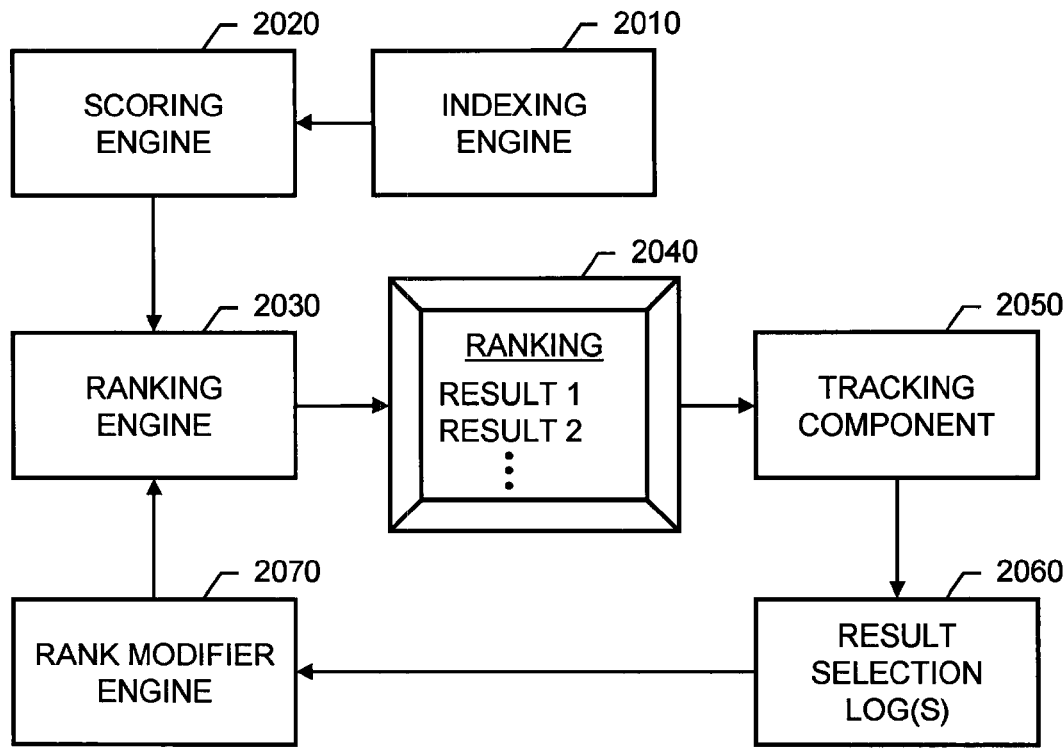
FIG. 2 shows example components of an information retrieval system.

FIG. 2 shows example components of an information retrieval system. These components can include an indexing engine 2010, a scoring engine 2020, a ranking engine 2030, and a rank modifier engine 2070. The indexing engine 2010 can function as described above for the indexing engine 1020. In addition, the scoring engine 2020 can generate scores for document results based on many different features, including content-based features that link a query to document results, and query-independent features that generally indicate the quality of document results. The content-based features can include aspects of document format, such as query matches to title or anchor text in an HTML (Hyper Text Markup Language) page. The query-independent features can include aspects of document cross-referencing, such as the PageRank of the document or the domain. Moreover, the particular functions used by the scoring engine 2020 can be tuned, to adjust the various feature contributions to the final IR score, using automatic or semi-automatic processes.

The ranking engine 2030 can produce a ranking of document results 2040 for display to a user based on IR scores received from the scoring engine 2020 and one or more signals from the rank modifier engine 2070. A tracking component 2050 can be used to record information regarding individual user selections of the results presented in the ranking 2040. For example, the tracking component 2050 can be embedded JavaScript code included in a web page ranking 2040 that identifies user selections (clicks) of individual document results and also identifies when the user returns to the results page, thus indicating the amount of time the user spent viewing the selected document result. In other implementations, the tracking component 2050 can be a proxy system through which user selections of the document results are routed, or the tracking component can include pre-installed software at the client (e.g., a toolbar plug-in to the client's operating system). Other implementations are also possible, such as by using a feature of a web browser that allows a tag/directive to be included in a page, which requests the browser to connect back to the server with message(s) regarding link(s) clicked by the user.

The recorded information can be stored in result selection log(s) 2060. The recorded information can include log entries that indicate, for each user selection, the query (Q), the document (D), the time (T) on the document, the language (L) employed by the user, and the country (C) where the user is likely located (e.g., based on the server used to access the IR system). Other information can also be recorded regarding user interactions with a presented ranking, including negative information, such as the fact that a document result was presented to a user, but was not clicked, position(s) of click(s) in the user interface, IR scores of clicked results, IR scores of all results shown before the clicked result, the titles and snippets shown to the user before the clicked result, the user's cookie, cookie age, IP (Internet Protocol) address, user agent of the browser, etc. Sill further information can be recorded, such as described below during discussion of the various features that can be used to build a prior model. Moreover, similar information (e.g., IR scores, position, etc.) can be recorded for an entire session, or multiple sessions of a user, including potentially recording such information for every click that occurs both before and after a current click.

The information stored in the result selection log(s) 2060 can be used by the rank modifier engine 2070 in generating the one or more signals to the ranking engine 2030. In general, a wide range of information can be collected and used to modify or tune the click signal from the user to make the signal, and the future search results provided, a better fit for the user's needs. Thus, user interactions with the rankings presented to the users of the information retrieval system can be used to improve future rankings.

The components shown in FIG. 2 can be combined in various manners and implemented in various system configurations. For example, the scoring engine 2020 and the ranking engine 2030 can be merged into a single ranking engine, such as the ranking engine 1052 of FIG. 1. The rank modifier engine 2070 and the ranking engine 2030 can also be merged, and in general, a ranking engine includes any software component that generates a ranking of document results after a query. Moreover, a ranking engine can be included in a client system in addition to (or rather than) in a server system.

Figure 3:
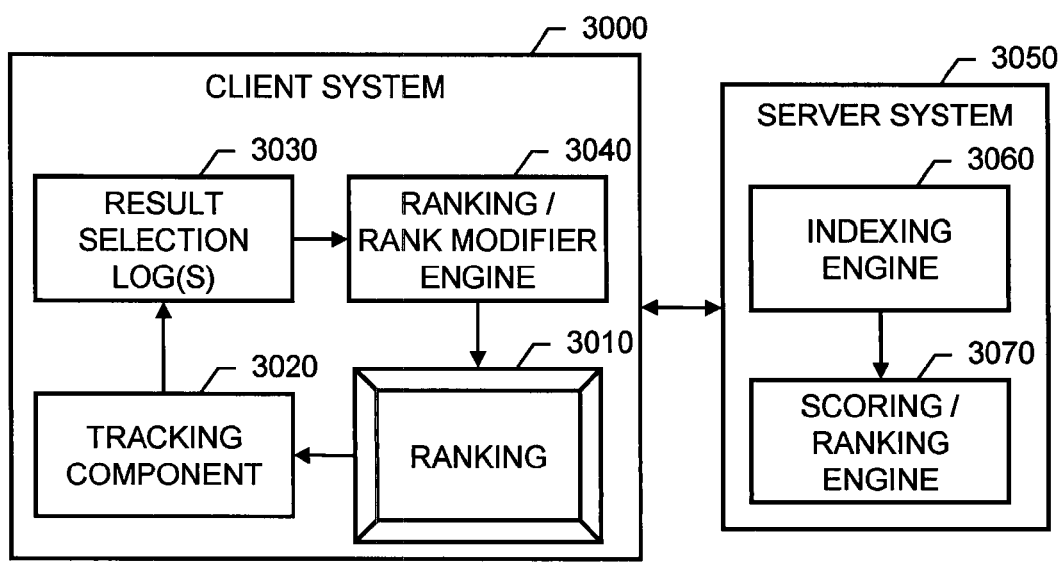
FIG. 3 shows another example information retrieval system.

FIG. 3 shows another example information retrieval system. In this system, a server system 3050 includes an indexing engine 3060 and a scoring/ranking engine 3070. A client system 3000 includes a user interface for presenting a ranking 3010, a tracking component 3020, result selection log(s) 3030 and a ranking/rank modifier engine 3040. For example, the client system 3000 can include a company's enterprise network and personal computers, in which a browser plug-in incorporates the ranking/rank modifier engine 3040. When an employee in the company initiates a search on the server system 3050, the scoring/ranking engine 3070 can return the search results along with either an initial ranking or the actual IR scores for the results. The browser plug-in can then re-rank the results locally based on tracked page selections for the company-specific user base.

Figure 4A:
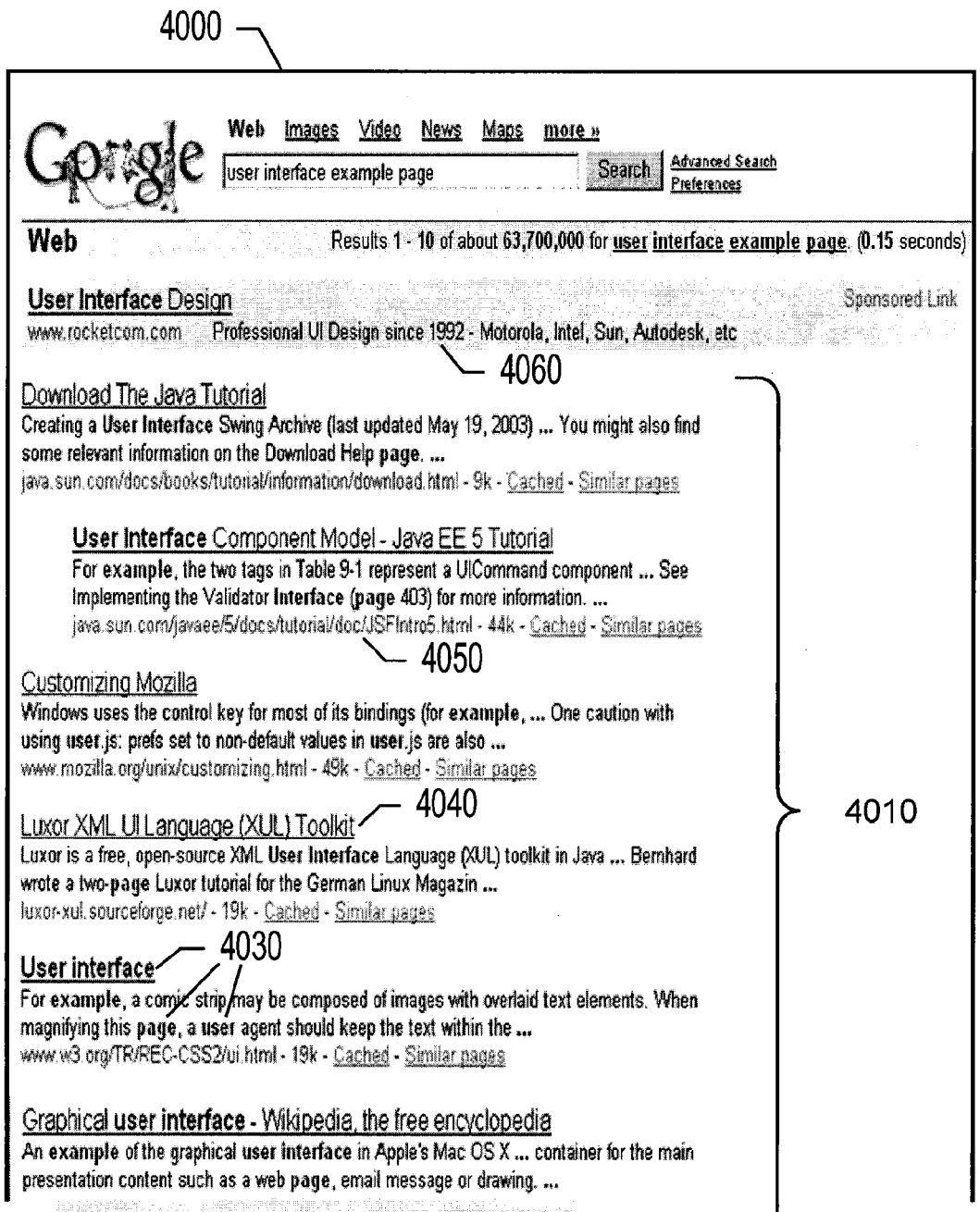
FIG. 4A shows an example user interface of a document search service for presenting a ranking.

FIG. 4A shows an example user interface 4000 of a document search service, such as described above, for presenting a ranking. Individual selections of document results 4010 can be tracked within the context of a search query for which the document results 4010 are returned. For example, in the context of this example web based information retrieval system, user's click data on web page search results 4010 can be gathered and stored in log(s), which can be kept for all user queries. When a user clicks on a search result, the click can be tracked via JavaScript code embedded in the search results page, an embedded browser tag, etc. This code can track when and on what a user clicks in the main search results page, and can track when the user returns to that main page.

Post-click behavior can also be tracked via pre-installed software at the client (e.g., a toolbar plug-in to the client's operating system). Provided the user opts into fully sharing their browsing behavior, the toolbar software can track all the pages that the user visits, both before and after the search results page is delivered.

The information gathered for each click can include: (1) the query (Q) the user entered, (2) the document result (D) the user clicked on, (3) the time (T) on the document, (4) the interface language (L) (which can be given by the user), (5) the country (C) of the user (which can be identified by the host that they use, such as www-google-co-uk to indicate the United Kingdom), and (6) additional aspects of the user and session. The time (T) can be measured as the time between the initial click through to the document result until the time the user comes back to the main page and clicks on another document result. Moreover, an assessment can be made about the time (T) regarding whether this time indicates a longer view of the document result or a shorter view of the document result, since longer views are generally indicative of quality for the clicked through result. This assessment about the time (T) can further be made in conjunction with various weighting techniques.

Document views resulting from the selections can be weighted based on viewing length information to produce weighted views of the document result. Thus, rather than simply distinguishing long clicks from short clicks, a wider range of click through viewing times can be included in the assessment of result quality, where longer viewing times in the range are given more weight than shorter viewing times. This weighting can be either continuous or discontinuous.

A continuous function can be applied to the document views resulting from the selections. Thus, the weight given to a particular click through time can fall within a continuous range of values, as defined by the specified function. Alternatively, a discontinuous function can be applied to the document views resulting from the selections. For example, there can be three viewing time categories, each having a corresponding weight. Note that such functions can be explicitly defined, or merely implicit in the software implementation.

In the case of discontinuous weighting, the individual selections of the document result can be classified into viewing time categories, and weights can be assigned to the individual selections based on results of the classifying. For example, a short click can be considered indicative of a poor page and thus given a low weight (e.g., −0.1 per click), a medium click can be considered indicative of a potentially good page and thus given a slightly higher weight (e.g., 0.5 per click), a long click can be considered indicative of a good page and thus given a much higher weight (e.g., 1.0 per click), and a last click (where the user doesn't return to the main page) can be considered as likely indicative of a good page and thus given a fairly high weight (e.g., 0.9). Note that the click weighting can also be adjusted based on previous click information. For example, if another click preceded the last click, the last click can be considered as less indicative of a good page and given only a moderate weight (e.g., 0.3 per click).

The various time frames used to classify short, medium and long clicks, and the weights to apply, can be determined for a given search engine by comparing historical data from user selection logs with human generated explicit feedback on the quality of search results for various given queries, and the weighting process can be tuned accordingly. Furthermore, these time frames and weights can be adjusted based on one or more viewing length differentiators, as is described further below.

The weighted views of the document result can be combined to determine a number to be used in determining a measure of relevance. For example, the weighted clicks described above can be summed together for a given query-document pair. Note that safeguards against spammers (users who generate fraudulent clicks in an attempt to boost certain search results) can be taken to help ensure that the user selection data is meaningful, even when very little data is available for a given (rare) query. These safeguards can include employing a user model that describes how a user should behave over time, and if a user doesn't conform to this model, their click data can be disregarded. The safeguards can be designed to accomplish two main objectives: (1) ensure democracy in the votes (e.g., one single vote per cookie and/or IP for a given query-URL (Universal Resource Locator) pair), and (2) entirely remove the information coming from cookies or IP addresses that do not look natural in their browsing behavior (e.g., abnormal distribution of click positions, click durations, clicks_per_minute/hour/day, etc.). Suspicious clicks can be removed, and the click signals for queries that appear to be spammed need not be used (e.g., queries for which the clicks feature a distribution of user agents, cookie ages, etc. that do not look normal).

A measure of relevance for the document result can be determined within the context of the search query for which the document result is returned. This measure of relevance can be calculated as a fraction, which can be directly applied to IR scores of the search results, thereby boosting the documents in the resulting ranking that have implicit user feedback indicating document quality. For example, a traditional click fraction, which takes into consideration the other results for the given query, has been defined as follows:

$$BASE=[\#WC(Q,D)]/[\#WC(Q)+S0]$$

where #WC(Q,D) is the sum of weighted clicks for a query-URL pair, #WC(Q) is the sum of weighted clicks for the query (summed over all results for the query), and S0 is a smoothing factor.

The traditional click fraction can also employ per-language and per-country fractions (with smoothing there between):

$$LANG=[\#WC(Q,D,L)+S1\cdot BASE]/[\#WC(Q,L)+S1]$$

$$COUNTRY=[\#WC(Q,D,L,C)+S2\cdot LANG]/[\#WC(Q,L,C)+S2]$$

where LANG incorporates language specific click data, plus BASE, and COUNTRY incorporates country (and language) specific click data, plus LANG. In this manner, if there is less data for the more specific click fractions, the overall fraction falls back to the next higher level for which more data is available.

Furthermore, it should be noted that different smoothing factors S0, S1 and S2 can be used, or one or more of these can be the same smoothing factor. The smoothing factors used can be determined based on how much traffic is received within the context of the click fraction. For example, for a given country-language tuple, the smoothing factor can be raised concordant with the amount of traffic received (e.g., a larger smoothing factor can be used for US-English queries if a good deal more of such queries are received). In addition, the smoothing factor can be increased for query sources that have historically generated more spamming activity (e.g., queries from Russia).

Another click fraction can be used which can consider the quality of a search result, irrespective of other results for the query. This fraction, referred to as Long Click Count (LCC), can provide an indication of the percentage of clicks on a document that are categorized as "long clicks". The LCC fraction can help to deal with presentation bias (i.e., some documents, such as the topmost document in a results list, or documents that have bolded titles or other difference in appearance, will typically have higher click counts than other documents that don't have these features). The LCC click fraction can be defined as follows:

$$BASE=[\#WC(query,url)]/[\#C(query,url)+S0]$$

where #WC(query,url) is the sum of weighted clicks for the query-URL pair, #C(query) is the total number of clicks (ordinal count, not weighted) for the query and URL, and S0 is a smoothing factor. Unlike the traditional fraction, only clicks for the given URL are considered in the LCC click fraction. At a high level, the LCC fraction can be interpreted as a measure of how long people stayed on the page given that they clicked on it, independent of the other results for that query. Therefore, the LCC click fraction can be high for a given URL even if it gets far fewer clicks than a comparable result in a higher position. Further, since the LCC fraction measures how long the average user stayed on the page once they clicked on it, the LCC fraction can be immune to presentation bias issues (e.g., an attractive title).

Similar to the traditional click fraction, the LCC fraction has associated per-language and per-country LCC fractions. The per-language LCC fraction can be defined as follows:

$$BASE=[\#WC(query,url,language)]/[\#C(query,url,language)+S1]$$

where #WC(query,url,language) is the sum of weighted clicks for the query-URL-language combination, #C(query, language) is the total number of clicks (ordinal count, not weighted) for the query, URL, and language, and S1 is a smoothing factor. The per-country LCC fraction can be defined as follows:

$$BASE=[\#WC(query,url,language,country)]/[\#C(query,url,language,country)+S2]$$

where #WC(query,url,language,country) is the sum of weighted clicks for the query, URL, language, and country, #C(query,language,country) is the total number of clicks (ordinal count, not weighted) for the query, URL, language, and country, and S2 is a smoothing factor.

The LCC fractions can be smoothed in a similar manner to the traditional click fractions (e.g., different smoothing factors S0, S1 and S2 can be used, or one or more of these can be the same smoothing factor and the smoothing factors used can be determined based on how much traffic is received within the context of the click fraction). Also similar to the traditional click fraction, the LCC fraction can be directly applied to IR scores of the search results, thereby boosting the documents in the resulting ranking that have implicit user feedback indicating document quality.

In addition, as mentioned above, one or more viewing length differentiators (e.g., query category and user type) can be identified for use in the weighting. A viewing length differentiator can include a factor governed by a determined category of the search query, a factor governed by a determined type of a user generating the individual selections, or a combination of them. The document views can be weighted based on the viewing length information in conjunction with the viewing length differentiator(s), such as the determined category of the search query and the determined type of the user. Thus, in the discontinuous weighting case (and the continuous weighting case), the threshold(s) (or formula) for what constitutes a good click can be evaluated on query and user specific bases. For example, the query categories can include "navigational" and "informational", where a navigational query is one for which a specific target page or site is likely desired (e.g., a query such as "BMW"), and an informational query is one for which many possible pages are equally useful (e.g., a query such as "George Washington's Birthday"). Note that such categories may also be broken down into sub-categories as well, such as informational-quick and informational-slow: a person may only need a small amount of time on a page to gather the information they seek when the query is "George Washington's Birthday", but that same user may need a good deal more time to assess a result when the query is "Hilbert transform tutorial".

The query categories can be identified by analyzing the IR scores or the historical implicit feedback provided by the click fractions. For example, significant skew in either of these (meaning only one or a few documents are highly favored over others) can indicate a query is navigational. In contrast, more dispersed click patterns for a query can indicate the query is informational. In general, a certain category of query can be identified (e.g., navigational), a set of such queries can be located and pulled from the historical click data, and a regression analysis can be performed to identify one or more features that are indicative of that query type (e.g., mean staytime for navigational queries versus other query categories; the term "staytime" refers to time spent viewing a document result, also known as document dwell time).

Traditional clustering techniques can also be used to identify the query categories. This can involve using generalized clustering algorithms to analyze historic queries based on features such as the broad nature of the query (e.g., informational or navigational), length of the query, and mean document staytime for the query. These types of features can be measured for historical queries, and the threshold(s) can be adjusted accordingly. For example, K means clustering can be performed on the average duration times for the observed queries, and the threshold(s) can be adjusted based on the resulting clusters.

User types can also be determined by analyzing click patterns. For example, computer savvy users often click faster than less experienced users, and thus users can be assigned different weighting functions based on their click behavior. These different weighting functions can even be fully user specific (a user group with one member). For example, the average click duration and/or click frequency for each individual user can be determined, and the threshold(s) for each individual user can be adjusted accordingly. Users can also be clustered into groups (e.g., using a K means clustering algorithm) based on various click behavior patterns.

Moreover, the weighting can be adjusted based on the determined type of the user both in terms of how click duration is translated into good clicks versus not-so-good clicks, and in terms of how much weight to give to the good clicks from a particular user group versus another user group. Some user's implicit feedback may be more valuable than other users due to the details of a user's review process. For example, a user that almost always clicks on the highest ranked result can have his good clicks assigned lower weights than a user who more often clicks results lower in the ranking first (since the second user is likely more discriminating in his assessment of what constitutes a good result). In addition, a user can be classified based on his or her query stream. Users that issue many queries on (or related to) a given topic (e.g., queries related to law) can be presumed to have a high degree of expertise with respect to the given topic, and their click data can be weighted accordingly for other queries by them on (or related to) the given topic.

As shown in FIG. 4A, many other factors, independent of quality, affect the likelihood of a result being clicked. For example, the presented rank (the position) of the document results 4010 is highly correlated with click rate in the sense that the top result will receive many more clicks than the last result, even if their positions are swapped. The user interface 4000 presents the search results for the query using multiple pages, and an interface element 4020 allows the user to view additional pages of search results as desired. Thus, many of the document results for a typical search may never be viewed at all by the user.

In general, the presentation of the results in the page can have a big impact on the observed click rates, and various aspects of presentation are often independent of the quality of a given result. The bolding 4030 of the results (both in the title and the snippet), length of titles 4040, indenting 4050, presence of ads 4060 (or similar objects that appear above the first result for a given query) can affect the observed click rates.

Figure 4B:
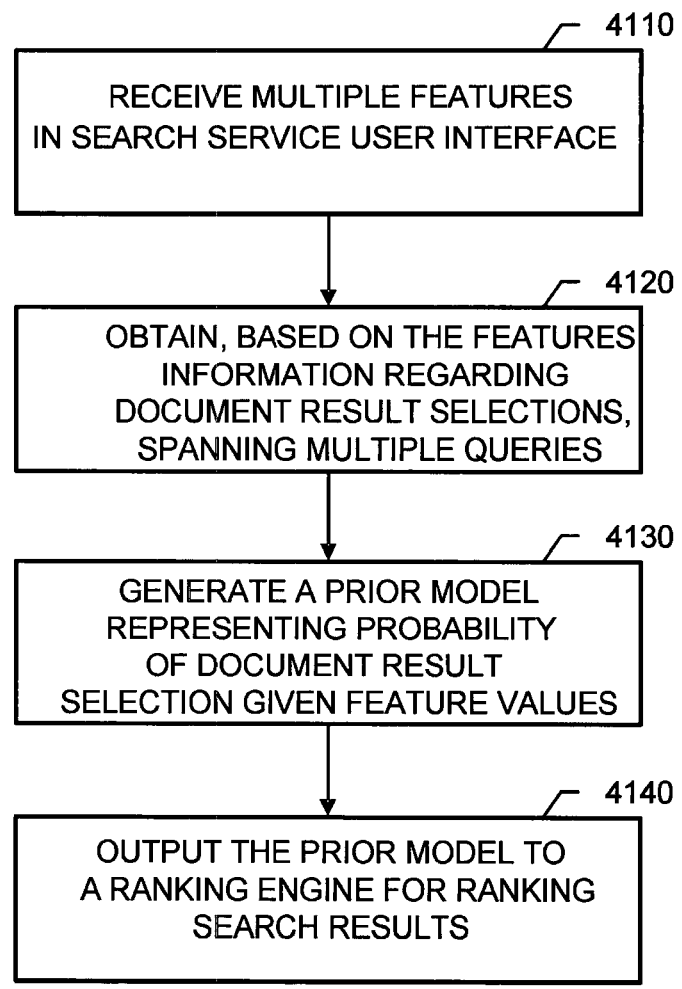
FIG. 4B shows an example process of building a prior model for use in enhancing the quality of signals from document result selections.

FIG. 4B shows an example process of building a prior model for use in enhancing the quality of signals from document result selections. Multiple features can be received 4110 for search results presented in a user interface of a document search service. For example, the first feature can be the position of the document result in the user interface within the context of the search query for which the document result is returned, and a second feature can be the language (L) of the search query. In general, the set of features used can include features that are correlated with click rate and that are independent of the query (Q) and the search result (D). However, in some implementations, the specific query (Q) or the general type of query (e.g., as defined by query clustering) can be used as a feature in the prior model. In any event, the selection of features, which are predictive of click through, can be guided by standard information gain feature selection techniques.

Figure 4C:
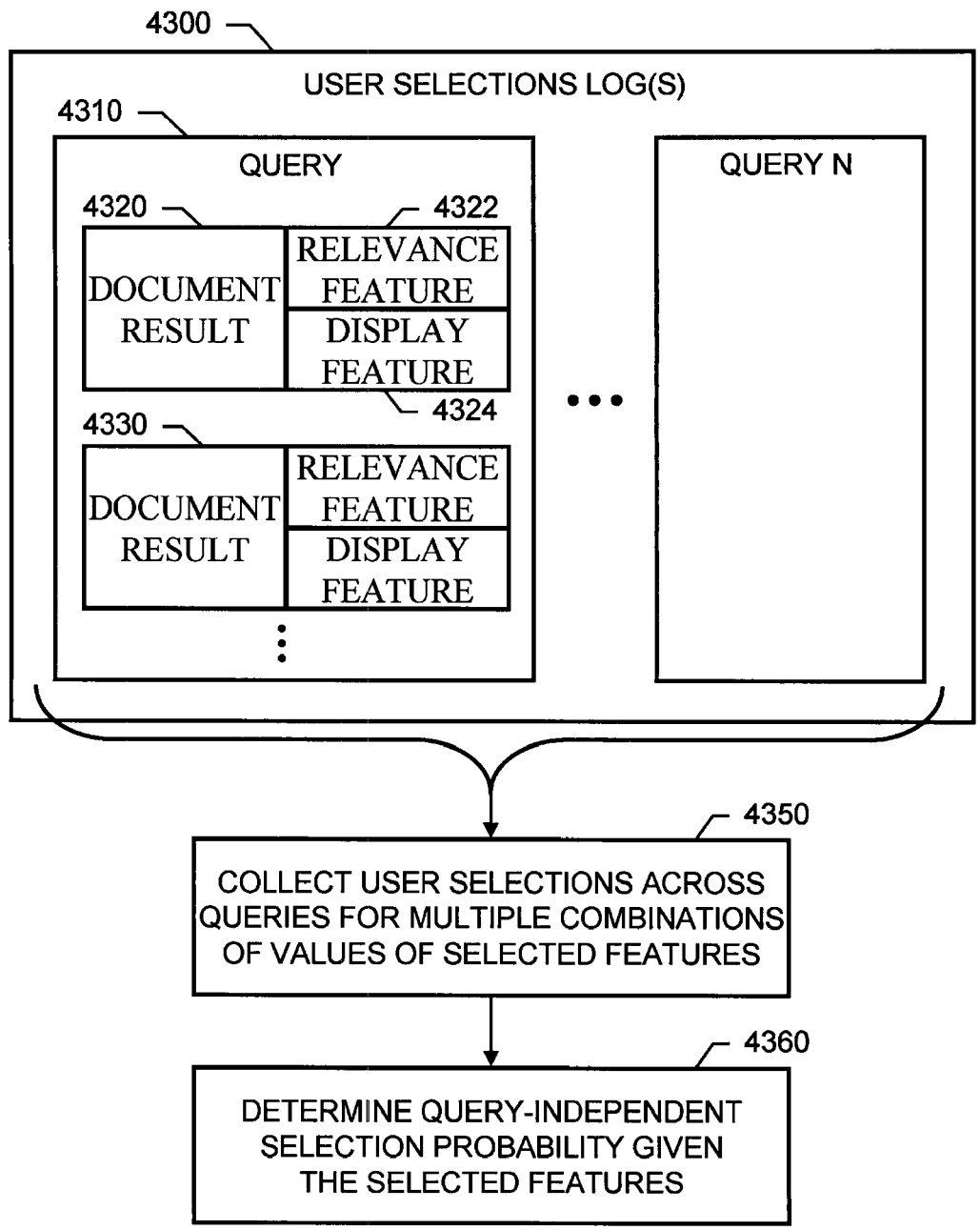
FIG. 4C shows example features and an example process of building a prior model.

Based on the multiple features, information regarding document result selections for searches performed using the document search service can be obtained 4120, where the information spans multiple different queries. This information can be used to generate 4130 a prior model, where the prior model represents a probability of document result selection (e.g., a query-independent probability of selection) given values of the multiple features. For example, FIG. 4C shows example features and an example process of building a prior model.

One or more user selection log(s) 4300 include click through data, such as described above. These user selection log(s) 4300 can be understood conceptually as a set of queries, including a first query 4310 through query N, where many user searches, and document result selections, have been observed within the context of each query. A query 4310 includes a document result 4320 that was selected by a user, and the document result 4320 can have an associated relevance feature 4322 (e.g., the IR score of the document) and an associated display bias feature 4324 (e.g., the position of the document).

In addition, another document result 4330, which was returned along with first document result 4320 within the context of the query 4310, has its own associated relevance feature and display bias feature. These features of the document result 4330, presented along with the document result 4320, can be considered features of the document result 4320. Thus, for example, even if the document result 4330 was never selected, the IR score of the document result 4330 can be saved as a feature of the document result 4320, which was selected, in a single log entry including the IR score of the result 4320, the position of result 4320, and the IR score of the result 4330 returned along with result 4320. Note that being "returned along with" does not indicate the two documents were necessarily displayed in the same page of the user interface, but only that the two documents were included in the search results for the given query.

Thus, given a set of selected features, user selections can be collected 4350 from the user selection log(s) 4300 across queries (e.g., independent of query) for multiple combinations of values of the selected features, where those features can include a feature related to another document returned along with a selected document within the context of a query. This collecting can involve accumulating counts observed in the log(s) 4300, including separately accumulating short, medium and long clicks, as well as the event of a result being shown, but another result being clicked.

A query-independent selection probability can be determined 4360 given the selected features. For example, in the case of the features being position and language, the number of long, short and medium clicks at position 1 on an English language search site can be extracted from the log(s) 4300, as well as the number of times other results have been clicked while a result at position 1 on the English language search site has been shown. These numbers can be found for every combination of position and language to determine the query-independent selection probability. In general, a mapping can be computed (based on the log(s) 4300) between the selected feature values and a predicted click through rate to produce a prior model for the selected features.

If the number of feature value combinations is too large (e.g., due to limitations on data storage or processing resources), the features can be split into two groups. The first group can include a reduced set of more important features, and the second group can contain the rest (i.e., two disjoint groups forming the full set of features). The first group can be used for accumulating click counts based on all possible combinations of feature values in the first group. With the click counts collected, the prior model can be trained on the values of the second group of features. Note that the prior model can be a standard linear or logistic regression, or other model types. In general though, the prior model can essentially represent the statistics of historical click data, indicating what percentage of people clicked on a result given presentation of the result and the set of features. Moreover, splitting the features into two groups can allow the use of a larger number of parameters in the model (for every combination of feature values in group one), but not so many parameters that the model cannot be trained.

Referring again to FIG. 4B, the prior model can, be output 4140 to a ranking engine for ranking of search results. The prior model can be saved to a computer-readable medium for use by the ranking engine, or otherwise made available to the ranking engine. Subsequent to this, and given a search event (query+a set of results), the features of the prior model can be evaluated, the combination of feature values for a given result can be looked up in the prior model to find a click through rate predicted by the prior model, and this predicted click through rate can be compared with the click through rate given by a separate implicit user feedback model (e.g., the traditional click fraction described above).

For example, for the position prior model described above, the ranking score of a search result can be multiplied by a number smaller than one if the traditional click fraction is smaller than the click fraction predicted by the prior model, or by a number greater than one otherwise. Thus, the prior model can be used to clean the signal of an implicit user feedback model that gives a measure of relevance for a document result within the context of the search query for which the document result is returned.

The manner in which the output signal of the prior model is used can be adjusted based on the specific implementation and historical data combined with human generated relevance ratings (e.g., employed in a tuning process to select an appropriate boosting transform for a given implementation). Moreover, the prior model can be used to modify and improve the ranking of search results generated for a given query, and the modified ranking can be presented to a user (e.g., on a display device in a web browser user interface).

Figure 4D:
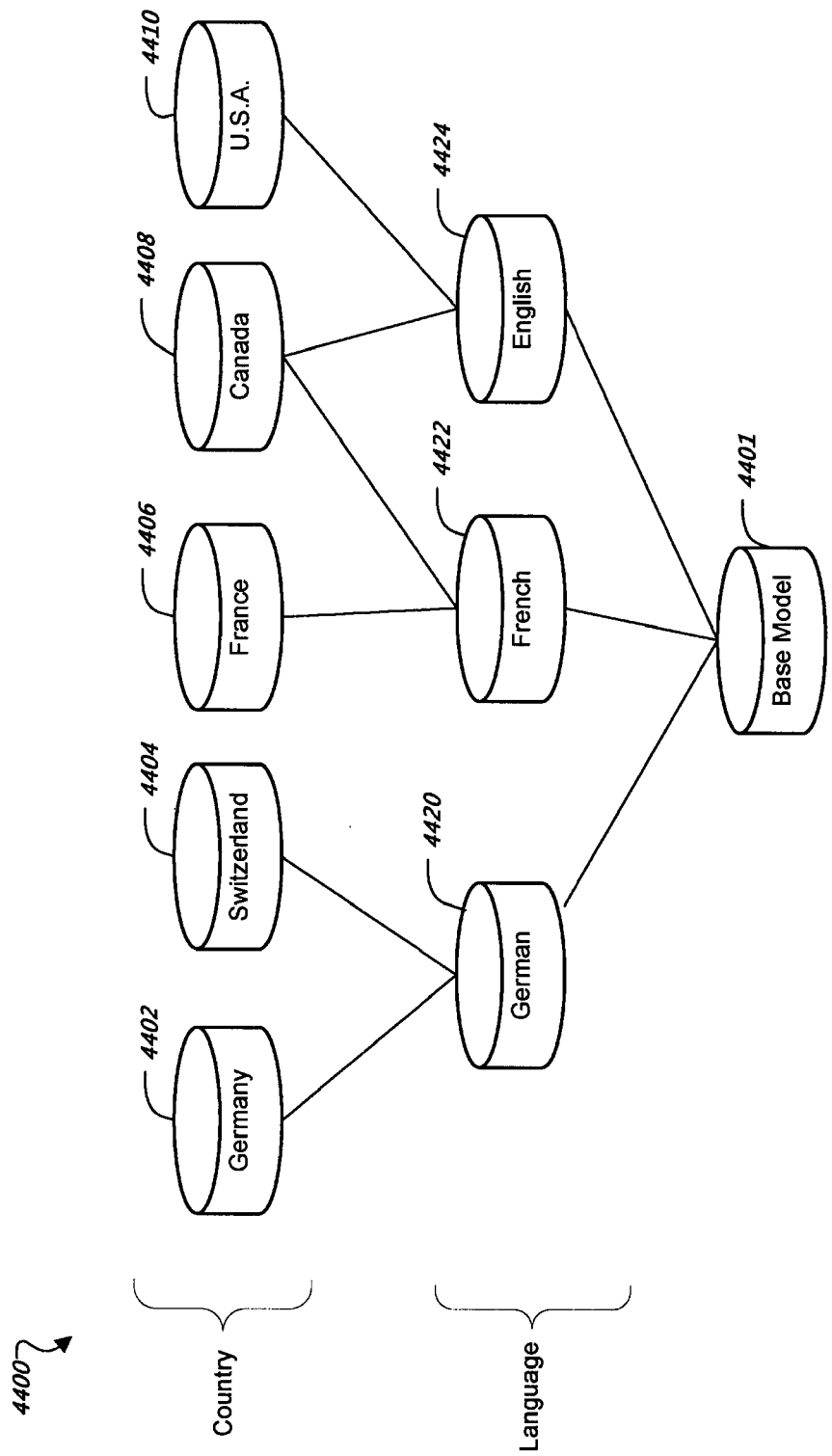
FIG. 4D shows an example hierarchy of databases for storing information associated with document search results.

FIG. 4D shows an example hierarchy of databases 4400 for storing information associated with document search results. For example, the databases 4400 in FIG. 4D can be used to store click data associated with the selection of results returned from a search query. For example, click data stored in the databases 4400 can include counts of how many long, medium and short clicks have occurred for each search result for a given query. The databases 4400 can be included in or be part of the result selection log(s) 2060 (FIG. 2).

The databases 4400 can store click data based on the context of the user performing the clicks. For example, click data associated with the country and the language of the user can be stored. The country of the user can be identified by the user interface used to perform the query (e.g., a country of Canada can be identified if a user performs a search using the Google Canadian search site www.google.ca), or the country can be identified by the language of the query, for example. A global base model database 4401 can include click data for all countries and all languages.

As searches are performed and search results are clicked on, click data can be stored in country databases 4402-4410, language databases 4420-4424, and in the global base model database 4401. For example, click data associated with clicks made by a French-speaking Canadian can be stored in the Canada country database 4408, the French language database 4422, and the base model 4401. Click data associated with clicks made by an English-speaking Canadian can be stored in the Canada country database 4408, the English language database 4424, and the base model 4401. Click data associated with clicks made by a French-speaking user using a French user interface can be stored in the France country database 4406, the French language database 4422, and the base model 4401. Click data associated with clicks made by an English-speaking American can be stored in the U.S.A. country database 4410, the English language database 4424, and the base model 4401. Click data associated with clicks made by a German-speaking user using a German user interface can be stored in the Germany country database 4402, the German language database 4420, and the base model 4401. Click data associated with clicks made by a German-speaking Swiss user can be stored in the Switzerland country database 4404, the German language database 4402, and the base model 4401.

The click data stored in the databases 4400 can be used to calculate traditional and LCC click fractions. The click data in the language, country and global databases can be used to modify a rank of a document in a search results list. If there is sufficient data in the country database, country-specific click data can be used. If there is not sufficient data (e.g., a small number of records) in the country database, data in the language database can be used. For example, for a given English query from Canada, if there is no data associated with that query in the Canada database 4408, there may be associated data in the English database 4424 (e.g., click data associated with the query may have come from clicks from another English-speaking country, such as the U.S.). If there is no data associated with a query in the country or language databases, there may be data associated with the query in the base model database 4401.

The hierarchy presented in FIG. 4D is a logical hierarchy. Separate physical databases can be used, one for each country and language and one for the base model, as illustrated in FIG. 4D, or a different number of databases may be used. For example, all country data may be stored in a single country database, with different country data identified by a country code included in records stored in the database. As another example, all click data may be stored in a single database, with country and language information distinguishable by country and language codes, for example.

Figure 4E:
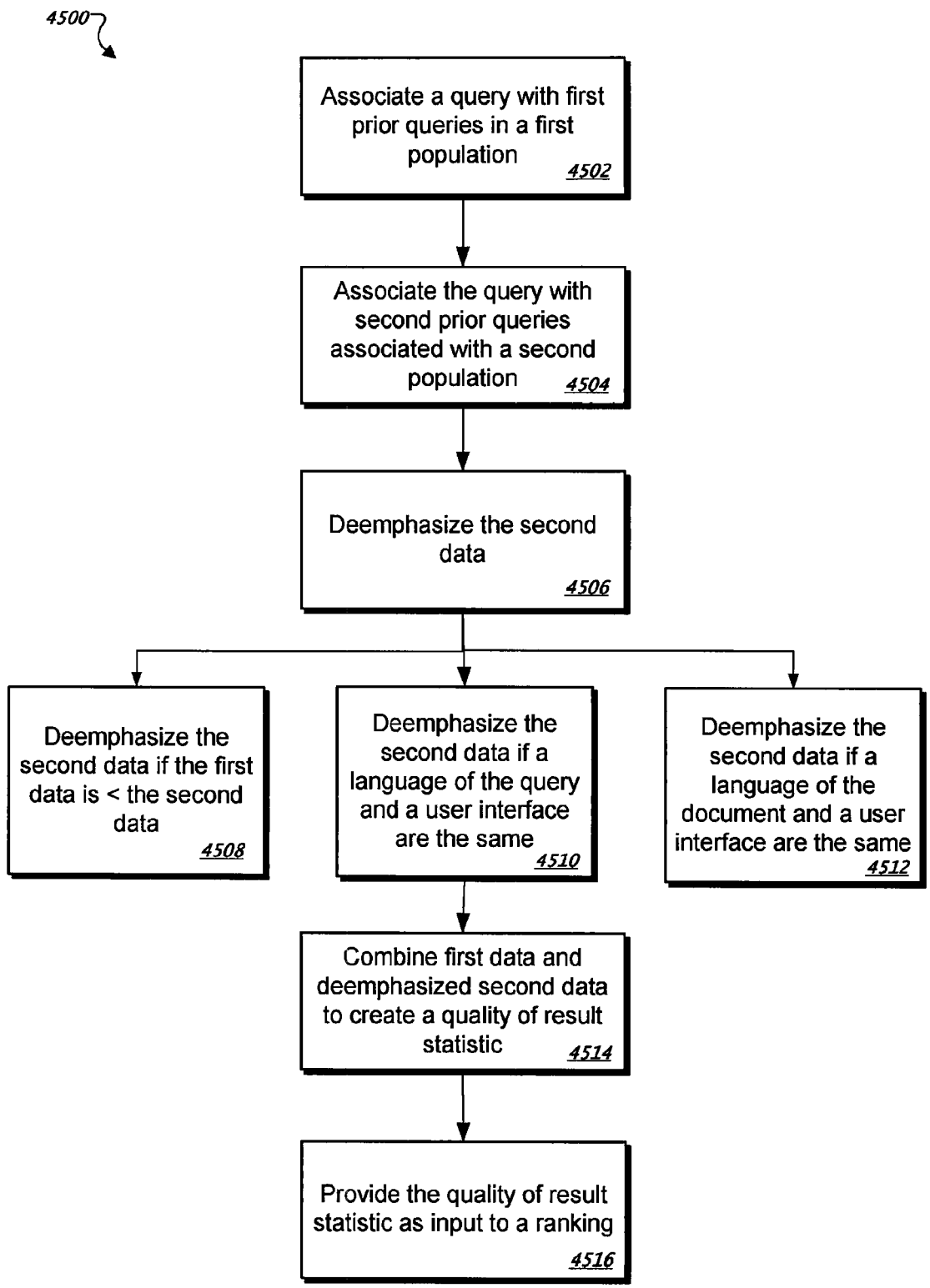
FIG. 4E shows an example of a method for providing an input to a ranking.

FIG. 4E shows an example of a method 4500 for providing an input to a ranking. The method 4500 can be performed, for example, by the rank modifier engine 2070 (FIG. 2).

First, a query is associated with first prior queries in a first population (step 4502). For example, a query originating from a particular country (e.g., Canada) can be associated with prior queries for the same information originating from that country (e.g., queries stored in the Canada country database 4408).

The query is then associated with second prior queries associated with a second population (step 4504). For example, the query entered from a user interface associated with a particular language (e.g., English) can be associated with prior queries for the same information entered in a user interface using the same language (e.g., the query can be associated with prior queries stored in the English language database 4424). As another example, the second prior queries can be queries from the global, base model database 4401 and the first prior queries can be queries associated with the language of the query (i.e., just as information from the associated language database can be used if insufficient data exists in the country database, the global database can be used if insufficient data exists in the language database).

The second data is then deemphasized (step 4506). For example, the data associated with the query language can be weighted less than data associated with the query country. If the language data is not deemphasized, popular results in a foreign country can have a disproportionate effect on the ranking, such as affecting the ranking more than less popular, but viable results from the country of the user entering the query. Generally speaking, the second population is more generic than the first population. Click fractions derived from more generic population data are to be trusted less than less generic population data, because they can include information from unrelated queries. Therefore, the more generic databases are deemphasized. The smoothing described above can do this "deemphasizing" automatically, so that if there is enough data in the more specific database (the first database), the data in the more generic databases can be ignored.

Next, one or more of the steps 4508, 4510, and 4512 can be performed. The second data is deemphasized if click fractions derived from the first data are less than click fractions derived from the second data (step 4508).

In a more generic formulation, from each database a quantity is derived with the property that the larger it is, the more it has a contribution to ranking. A value of 0 means that this ranking component does not modify ranking, while larger values provide the ability to make more significant changes to ranking. "First data less than second data" is a comparison between the derived quantities. The interpretation is that if the second database can make more significant changes to ranking than the first, it should be deemphasized to limit its effect on ranking. For example, a language-specific click fraction can be reduced if a country-specific click fraction is less than the language-specific click fraction.

Or the second data is deemphasized if a language of the query and a user interface are the same (step 4510). Foreigners, or people who speak a foreign language, may enter a foreign-language query in a particular search interface and expect the foreign results. For example, a person in the U.S. can enter a Chinese query using the U.S. Google search site, and Chinese results should not be penalized (i.e., not ranked lower).

Or the second data is deemphasized if a language of the document and a user interface are the same (step 4512). For example, users who select foreign-language results have likely already determined the language of the result before they make their selection. Therefore click fractions such as the language LCC fraction are not reduced if the language of the document is different than the language of the user interface.

After steps 4508-4512 are completed, the first data and deemphasized second data are combined to create a quality of result statistic (step 4514). For example, country-specific and language-specific click fractions can be included in a combined click fraction.

The quality of result statistic is provided as input to a ranking (step 4516). For example, the quality of result statistic can be provided to the ranking engine 2030 to adjust the ranking of search results for the query.

Figure 4F:
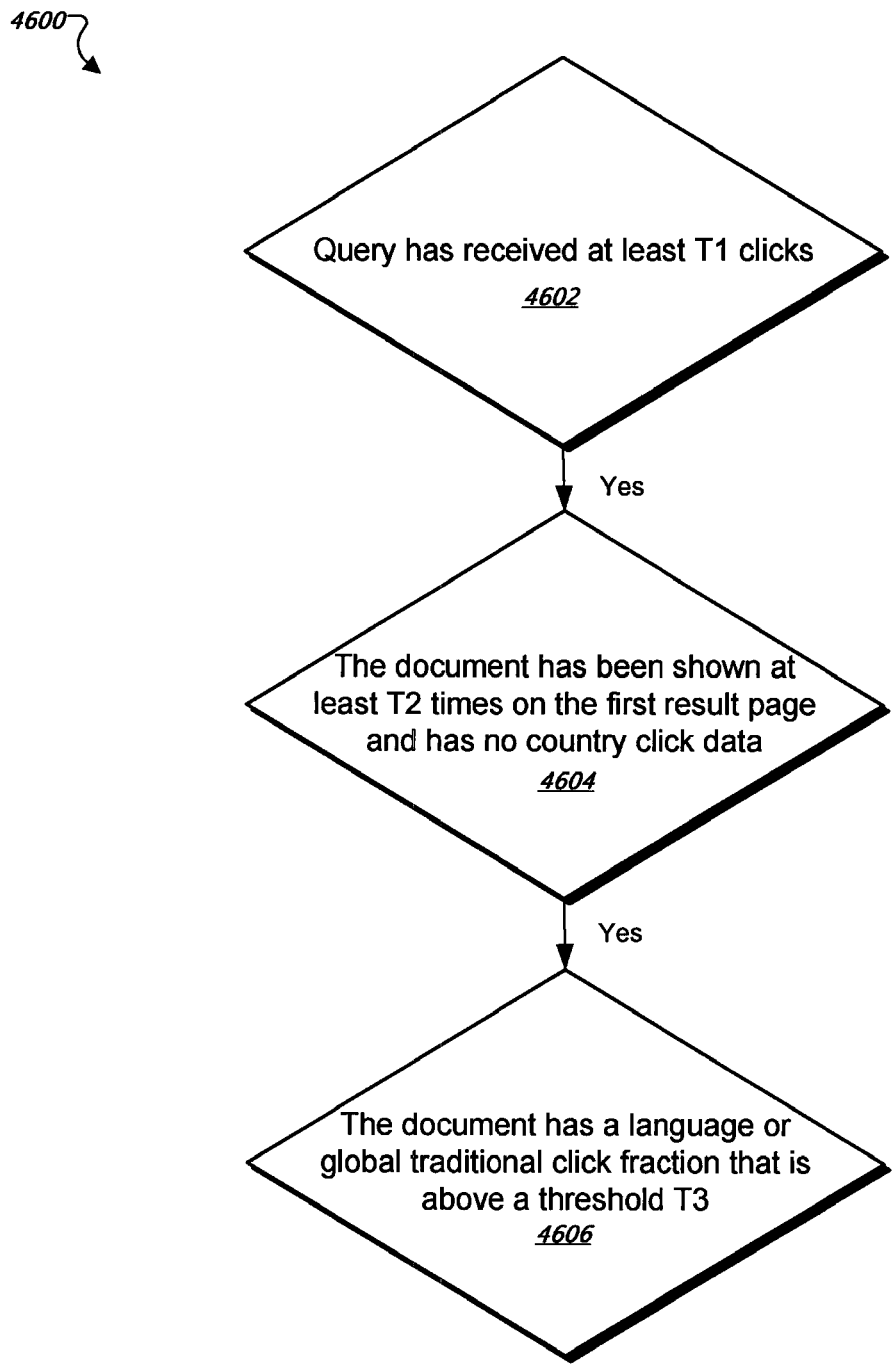
FIG. 4F is an example of a method for determining whether to provide an input to a ranking.

FIG. 4F is an example of a method 4600 for determining whether to provide an input to a ranking. For example, the method 4600 can be used to determine whether to perform method 4500 for a given query. The method 4600 can be performed, for example, by the rank modifier engine 2070 (FIG. 2). First, it is determined whether the query has received at least T1 clicks (step 4602). Quality of result statistics, such as those generated by the method 4500, can be computed if there have been at least a T1 threshold number (e.g., 100) of clicks for a given query.

If the query has at least T1 clicks, it is determined whether the document has been shown at least T2 times on the first result page and has no country click data (step 4604). T2 is a threshold value, such as 10. If a document has not been shown very often on the first results page, there is a low probability that it will be clicked on, so deemphasizing click data (e.g., as in method 4500) is meaningful for documents that have been displayed at least a certain number of times on the first results page.

If the document has been shown at least T2 times on the first results page and has no country click data, it is determined whether the document has a language or global traditional click fraction that is above a threshold T3 (step 4606). If neither the language nor global traditional click fractions for a document are above a threshold value such as 0.1, then it may not be meaningful to deemphasize them (e.g., as in method 4500). If the document has a language or global traditional click fraction that is above a threshold T3, then a method providing an input to a ranking (e.g., method 4500) can be performed.

Figure 5:
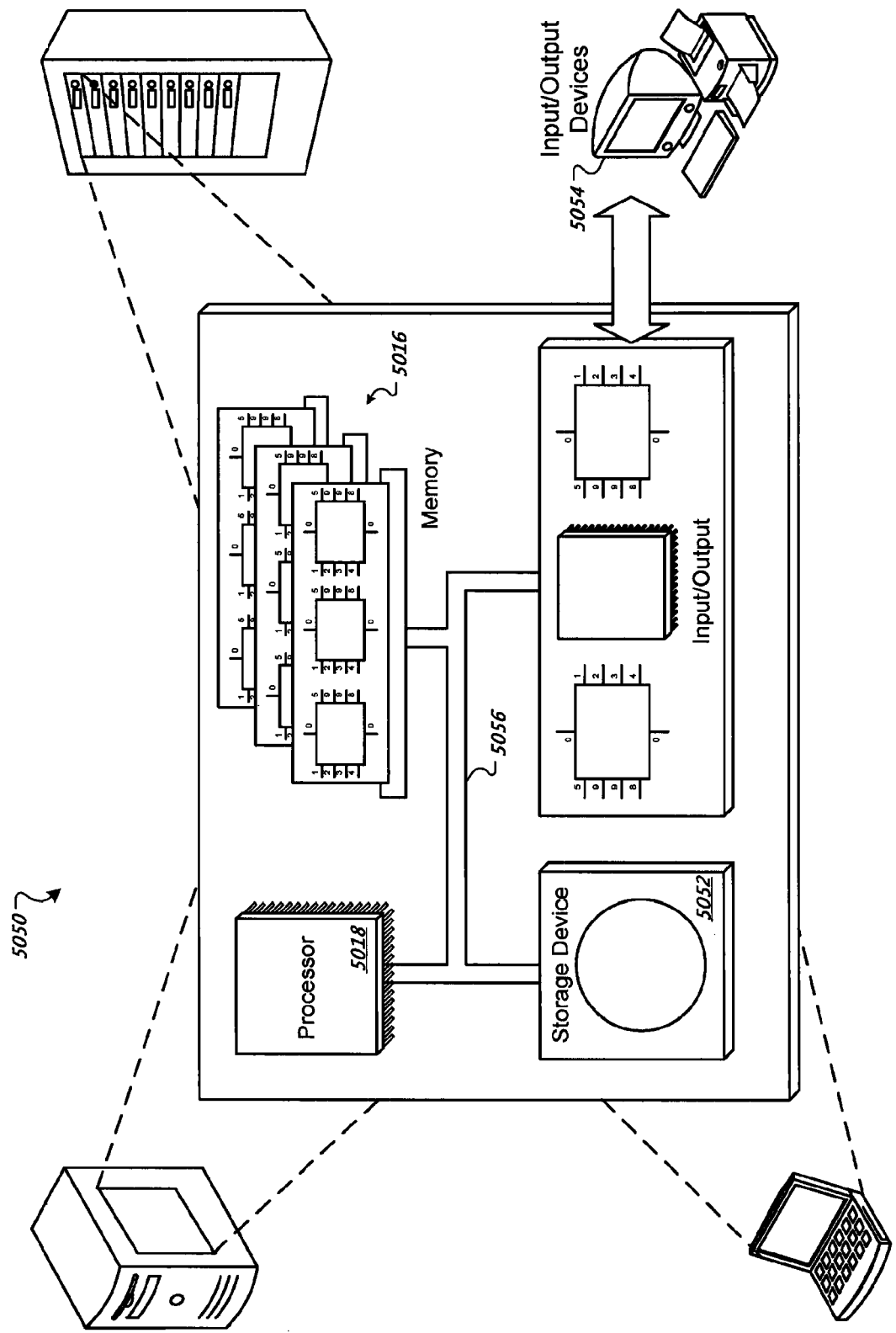
FIG. 5 is a schematic diagram of an example computer system.

FIG. 5 is a schematic diagram of an example computer system 5050. The system 5050 can be used for practicing operations described above. The system 5050 can include a processor 5018, a memory 5016, a storage device 5052, and input/output devices 5054. Each of the components 5018, 5016, 5052, and 5054 are interconnected using a system bus 5056. The processor 5018 is capable of processing instructions within the system 5050. These instructions can implement one or more aspects of the systems, components and techniques described above. In some implementations, the processor 5018 is a single-threaded processor. In other implementations, the processor 5018 is a multi-threaded processor. The processor 5018 can include multiple processing cores and is capable of processing instructions stored in the memory 5016 or on the storage device 5052 to display graphical information for a user interface on the input/output device 5054.

The memory 5016 is a computer readable medium such as volatile or non volatile that stores information within the system 5050. The memory 5016 can store processes related to the functionality of the search engine 1030, for example. The storage device 5052 is capable of providing persistent storage for the system 5050. The storage device 5052 can include a floppy disk device, a hard disk device, an optical disk device, or a tape device, or other suitable persistent storage mediums. The storage device 5052 can store the various databases described above. The input/output device 5054 provides input/output operations for the system 5050. The input/output device 5054 can include a keyboard, a pointing device, and a display unit for displaying graphical user interfaces.

The computer system shown in FIG. 5 is but one example. In general, embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Moreover, the server environment, which is configured to provide electronic search service and employ the ranking systems and techniques described, need not be implemented using traditional back-end or middleware components. The server environment can be implemented using a program installed on a personal computing apparatus and used for electronic search of local files, or the server environment can be implemented using a search appliance (such as GOOGLE® in a Box, provided by Google Inc. of Mountain View, Calif.) installed in an enterprise network.

Other implicit user feedback models can be used in place of the traditional click fraction model described. For example, an implicit user feedback model employing a large-scale logistic regression model that uses the actual query and url as features can be used. The new prior models can be used to denormalize any query-specific click model.

In addition, the prior model(s) can be applied in varying manners. For example, a prior model can be applied at run time as an adjustment to the ranking boost given to a document in accordance with the implicit user feedback model since the set of features used for the prior model can be available for direct input at run time. Alternatively, the prior model can be applied at model building time, where features are fetched from the log(s), which can result in improved response time during searches. In addition, when the model is applied at building time, the implicit feedback can be adjusted per each click record before aggregating the feedback from multiple clicks into a signal. This adjustment can be for instance a weighting of the clicks according to how much they were affected by display bias before the clicks are aggregated. At run time, the signal is typically only adjusted after the clicks were already aggregated, which can result in some loss of precision.

What is claimed is:

1. A computer-implemented method, the method comprising:
    identifying click data for a document, wherein the click data represents a plurality of selections of the document, each selection being weighted according to a respective viewing time of the document when the document was identified as a search result responsive to a query submitted by a respective user in a respective country in a respective language;
    calculating first click data by aggregating the weighted selections of the document that are for a same respective country in a respective language;
    calculating second click data by aggregating the weighted selections of the document that are for a same respective language;
    deemphasizing the second click data relative to the first click data based on, at least, a determination that a language of the query and a language of a user interface are the same; and
    calculating a quality of result statistic for the document by combining the first click data with the deemphasized second click data; and
    providing the quality of result statistic as an input to a ranking for the document.

2. The method of claim 1 wherein the deemphasizing further Comprises:
    determining a first click fraction based on the first click data;
    determining a second click fraction based on the second click data;
    determining whether the first click fraction is less than the second click fraction; and
    deemphasizing the second click data based at least partially on the determination that the first click fraction is less than the second click fraction.

3. The method of claim 1 wherein the deemphasizing further comprises:
    determining whether a language of the document and the language of the user interface are the same; and
    deemphasizing the second click data relative to the first click data based at least partially on the determination that the language of the document and the language of the user interface are the same.

4. The method of claim 1 in which the second click data is deemphasized by applying a smoothing factor to the second click data.

5. The method of claim 4 in which the smoothing factor is based at least partially on an amount of the first click data.

6. A non-transitory computer-readable medium having a computer program product stored thereon that, when executed by data processing apparatus, causes the data processing apparatus to perform operations comprising:
    identifying click data for a document, wherein the click data represents a plurality of selections of the document, each selection being weighted according to a respective viewing time of the document when the document was identified as a search result responsive to a query submitted by a respective user in a respective country in a respective language;

calculating first click data by aggregating the weighted selections of the document that are for a same respective country;

calculating second click data by aggregating the weighted selections of the document that are for a same respective language;

deemphasizing the second click data relative to the first click data based on, at least, a determination that a language of the query and a language of a user interface are the same; and calculating a quality of result statistic for the document by combining the first click data with the deemphasized second click data; and providing the quality of result statistic as an input to a ranking for the document.

7. The computer-readable medium of claim 6 wherein the deemphasizing further comprises:

determining a first click fraction based on the first click data;

determining a second click fraction based on the second click data;

determining whether the first click fraction is less than the second click fraction; and deemphasizing the second click data based at least partially on the determination that the first click fraction is less than the second click fraction.

8. The computer-readable medium of claim 6 wherein the deemphasizing further comprises:

determining whether a language of the document and the language of the user interface are the same; and deemphasizing the second click data relative to the first click data based at least partially on the determination that the language of the document and the language of the user interface are the same.

9. The computer-readable medium of claim 6 in which the second click data is deemphasized by applying a smoothing factor to the second click data.

10. The computer-readable medium of claim 9 in which the smoothing factor is based at least partially on an amount of the first click data.

11. A system comprising:

a storage device having instructions stored thereon; and one or more computers operable to execute the instructions to perform operations comprising:

identifying click data for a document, wherein the click data represents a plurality of selections of the document, each selection being weighted according to a respective viewing time of the document when the document was identified as a search result responsive to a query submitted by a respective user in a respective country in a respective language;

calculating first click data by aggregating the weighted selections of the document that are for a same respective country;

calculating second click data by aggregating the weighted selections of the document that are for a same respective language;

deemphasizing the second click data relative to the first click data based on, at least, a determination that a language of the query and a language of a user interface are the same; and calculating a quality of result statistic for the document by combining the first click data with the deemphasized second click data; and providing the quality of result statistic as an input to a ranking for the document.

12. The system of claim 11 wherein the deemphasizing further comprises:

determining a first click fraction based on the first click data;

determining a second click fraction based on the second click data;

determining whether the first click fraction is less than the second click fraction; and deemphasizing the second click data based at least partially on the determination that the first click fraction is less than the second click fraction.

13. The system of claim 11 wherein the deemphasizing further comprises:

determining whether a language of the document and the language of the user interface are the same; and deemphasizing the second click data relative to the first click data based at least partially on the determination that the language of the document and the language of the user interface are the same.

14. The system of claim 11 in which the second click data is deemphasized by applying a smoothing factor to the second click data.

15. The system of claim 14 in which the smoothing factor is based at least partially on an amount of the first click data.

16. The system of claim 11, wherein the one or more computers comprise a server operable to interact with a user interface device through a data communication network, and the user interface device is operable to interact with the server as a client.

17. The system of claim 16, wherein the user interface device comprises a computer running a web browser.

\* \* \* \* \*

UNITED STATES PATENT AND TRADEMARK OFFICE
CERTIFICATE OF CORRECTION

PATENT NO.      : 8,694,511 B1
APPLICATION NO. : 11/841313
DATED           : April 8, 2014
INVENTOR(S)     : Adrian Dumitru Corduneanu and Michelangelo Diligenti It is certified that error appears in the above-identified patent and that said Letters Patent is hereby corrected as shown below:

In the Claims

Column 18, Line 37, claim 2: delete "Comprises:" and insert -- comprises: --, therefor.

Signed and Sealed this
Eighth Day of July, 2014

Michelle K. Lee
*Deputy Director of the United States Patent and Trademark Office*